United States Patent
Sharlin et al.

(10) Patent No.: US 11,822,088 B2
(45) Date of Patent: Nov. 21, 2023

(54) ACTIVE OPTICAL ENGINE

(71) Applicant: LUMUS LTD., Ness Ziona (IL)

(72) Inventors: Elad Sharlin, Mishmar David (IL); Ronen Chriki, Lod (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 18/006,959

(22) PCT Filed: May 19, 2022

(86) PCT No.: PCT/US2022/029957
§ 371 (c)(1),
(2) Date: Jan. 26, 2023

(87) PCT Pub. No.: WO2022/246018
PCT Pub. Date: Nov. 24, 2022

(65) Prior Publication Data
US 2023/0213769 A1  Jul. 6, 2023

Related U.S. Application Data

(60) Provisional application No. 63/190,260, filed on May 19, 2021.

(51) Int. Cl.
*G02B 27/01* (2006.01)
*G02B 27/00* (2006.01)

(52) U.S. Cl.
CPC ..... *G02B 27/0172* (2013.01); *G02B 27/0081* (2013.01); *G02B 2027/0178* (2013.01)

(58) Field of Classification Search
USPC .............................................. 345/8
See application file for complete search history.

(56) References Cited

U.S. PATENT DOCUMENTS 2,748,659 A   6/1956 Walter et al.
2,795,069 A   6/1957 Hardesty
(Continued)

FOREIGN PATENT DOCUMENTS

CN   104570353   4/2015
CN   207424391   5/2018
(Continued)

OTHER PUBLICATIONS

International Commission on Non-Ionizing Radiation Protection "ICNIRP Guidelines for Limiting Exposure to Time-Varying Electric, Magnetic and Electromagnetic Fields (Up to 300 GHZ)" Published In: Health Physics 74 (4):494-522; 1998.
(Continued)

*Primary Examiner* — Chineyere D Wills-Burns
(74) *Attorney, Agent, or Firm* — SCULLY, SCOTT, MURPHY & PRESSER, P.C.

(57) ABSTRACT

In an embodiment, an apparatus is disclosed that includes at least one processor configured to determine a target coupling-out facet, identify an optical path to the target coupling-out facet, identify an active wave plate corresponding to the optical path, determine a target state of the active wave plate that corresponds to the optical path, set the active wave plate to the identified target state and cause a projection device to project a light beam comprising an image field of view component along the identified optical path.

20 Claims, 15 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt et al. |
| 4,084,883 A | 4/1978 | Eastman et al. |
| 4,191,446 A | 3/1980 | Arditty et al. |
| 4,309,070 A | 1/1982 | St. Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,720,189 A | 1/1988 | Heynen et al. |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Machler |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,870,159 A | 2/1999 | Sharp |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Friesem et al. |
| 5,982,536 A | 11/1999 | Swan et al. |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,231,992 B1 | 5/2001 | Niebauer et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,421,031 B1 | 7/2002 | Ronzani et al. |
| 6,490,104 B1 | 12/2002 | Gleckman et al. |
| 6,509,982 B2 | 1/2003 | Steiner |
| 6,542,307 B2 | 4/2003 | Gleckman et al. |
| 6,556,282 B2 | 4/2003 | Jamieson et al. |
| 6,577,411 B1 | 6/2003 | David |
| 6,580,529 B1 | 6/2003 | Amitai et al. |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,799,859 B1 | 10/2004 | Ida et al. |
| 6,829,095 B2 | 12/2004 | Amitai |
| 6,880,931 B2 | 4/2005 | Moliton et al. |
| 6,927,694 B1 | 8/2005 | Smith et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,418,170 B2 | 8/2008 | Mukawa et al. |
| 7,430,355 B2 | 9/2008 | Heikenfeld et al. |
| 7,448,170 B2 | 11/2008 | Skendžić et al. |
| 7,643,214 B2 | 1/2010 | Amitai |
| 7,672,055 B2 | 3/2010 | Amitai |
| 7,724,443 B2 | 5/2010 | Amitai |
| 7,778,508 B2 | 8/2010 | Hirayama |
| 7,949,214 B2 | 5/2011 | DeJong |
| 7,995,275 B2 | 8/2011 | Maeda et al. |
| 8,000,020 B2 | 8/2011 | Amitai |
| 8,035,872 B2 | 10/2011 | Ouchi |
| 8,369,019 B2 | 2/2013 | Baker et al. |
| 8,405,573 B2 | 3/2013 | Lapidot et al. |
| 8,655,178 B2 | 2/2014 | Capron et al. |
| 8,665,178 B1 | 3/2014 | Wang |
| 8,666,208 B1 | 3/2014 | Amirparviz |
| 8,718,437 B2 | 5/2014 | Coe-Sullivan et al. |
| 8,736,963 B2 | 5/2014 | Robbins et al. |
| 8,743,464 B1 | 6/2014 | Amirparviz |
| 8,913,865 B1 | 12/2014 | Bennett |
| 8,917,453 B2 | 12/2014 | Bohn |
| 8,965,152 B2 | 2/2015 | Simmonds |
| 9,170,425 B1 | 10/2015 | Harrison et al. |
| 9,348,143 B2 | 5/2016 | Gao et al. |
| 9,513,479 B2 | 12/2016 | Komatsu et al. |
| 9,541,762 B2 | 1/2017 | Mukawa et al. |
| 9,551,880 B2 | 1/2017 | Amitai |
| 9,625,723 B2 | 4/2017 | Lou et al. |
| 9,740,006 B2 | 8/2017 | Gao |
| 9,804,396 B2 | 10/2017 | Amitai |
| 9,805,633 B2 | 10/2017 | Zheng et al. |
| 9,927,614 B2 | 3/2018 | Vallius |
| 9,933,684 B2 | 4/2018 | Brown et al. |
| 10,007,115 B2 | 6/2018 | Greenhalgh et al. |
| 10,198,865 B2 | 2/2019 | Kezele et al. |
| 10,209,517 B2 | 2/2019 | Popovich et al. |
| 10,302,957 B2 | 5/2019 | Sissom |
| 10,326,983 B2 | 6/2019 | Hua et al. |
| 10,345,903 B2 | 7/2019 | Robbins et al. |
| 10,409,064 B2 | 9/2019 | Lee et al. |
| 10,416,452 B2 | 9/2019 | Cheng et al. |
| 10,551,622 B2 | 2/2020 | Robbins et al. |
| 11,226,261 B2 | 1/2022 | Lobachinsky et al. |
| 2002/0015233 A1 | 2/2002 | Park |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2004/0233534 A1 | 11/2004 | Nakanishi et al. |
| 2005/0018308 A1 | 1/2005 | Cassarly et al. |
| 2005/0084210 A1 | 4/2005 | Cha |
| 2005/0174641 A1 | 8/2005 | Greenberg et al. |
| 2005/0174658 A1 | 8/2005 | Long et al. |
| 2005/0180687 A1 | 8/2005 | Amitai |
| 2005/0248852 A1 | 11/2005 | Yamasaki |
| 2005/0265044 A1 | 12/2005 | Chen et al. |
| 2006/0052146 A1 | 3/2006 | Ou |
| 2006/0061555 A1 | 3/2006 | Mullen |

(56) References Cited

U.S. PATENT DOCUMENTS

| | | |
|---|---|---|
| 2006/0103590 A1 | 5/2006 | Divon |
| 2006/0126182 A1 | 6/2006 | Levola |
| 2006/0268421 A1 | 11/2006 | Shimizu et al. |
| 2007/0070859 A1 | 3/2007 | Hirayama |
| 2007/0091445 A1 | 4/2007 | Amitai |
| 2007/0165192 A1 | 7/2007 | Prior et al. |
| 2007/0188837 A1 | 8/2007 | Shimizu et al. |
| 2008/0094586 A1 | 4/2008 | Hirayama |
| 2008/0192239 A1 | 8/2008 | Otosaka |
| 2009/0190222 A1 | 7/2009 | Simmonds et al. |
| 2010/0053148 A1 | 3/2010 | Khazeni et al. |
| 2010/0111472 A1 | 5/2010 | DeJong |
| 2010/0201953 A1 | 8/2010 | Freeman et al. |
| 2010/0202128 A1 | 8/2010 | Saccomanno |
| 2010/0278480 A1 | 11/2010 | Vasylyev |
| 2010/0291489 A1 | 11/2010 | Moskovits et al. |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0120498 A1 | 5/2012 | Harrison et al. |
| 2012/0127062 A1 | 5/2012 | Bar-Zeev et al. |
| 2012/0147361 A1 | 6/2012 | Mochizuki et al. |
| 2012/0194781 A1 | 8/2012 | Agurok |
| 2012/0306940 A1 | 12/2012 | Machida et al. |
| 2013/0002122 A1 | 1/2013 | Kowalski et al. |
| 2013/0012022 A1 | 1/2013 | Hung et al. |
| 2013/0022316 A1 | 1/2013 | Pelletier et al. |
| 2013/0257832 A1 | 10/2013 | Hammond |
| 2013/0321432 A1 | 12/2013 | Burns |
| 2013/0334504 A1 | 12/2013 | Thompson et al. |
| 2014/0003762 A1 | 1/2014 | Macnamara |
| 2014/0043688 A1 | 2/2014 | Schrader |
| 2014/0140654 A1 | 5/2014 | Brown et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0153569 A1 | 6/2015 | Yonekubo |
| 2015/0160460 A1 | 6/2015 | Komatsu et al. |
| 2015/0160529 A1 | 6/2015 | Popovich et al. |
| 2015/0185475 A1 | 7/2015 | Saarikko et al. |
| 2015/0219834 A1 | 8/2015 | Nichol et al. |
| 2015/0241619 A1 | 8/2015 | Richards et al. |
| 2015/0378074 A1* | 12/2015 | Kollin .................. G02B 5/3016 359/485.05 |
| 2016/0003369 A1 | 1/2016 | Lv et al. |
| 2016/0018639 A1 | 1/2016 | Spitzer et al. |
| 2016/0018654 A1 | 1/2016 | Haddick et al. |
| 2016/0025393 A1 | 1/2016 | Rockwell |
| 2016/0109712 A1 | 4/2016 | Harrison et al. |
| 2016/0116743 A1 | 4/2016 | Amitai |
| 2016/0161740 A1 | 6/2016 | Bar-Zeev et al. |
| 2016/0170214 A1 | 6/2016 | Amitai |
| 2016/0189432 A1 | 6/2016 | Bar-Zeev et al. |
| 2016/0198949 A1 | 7/2016 | Spitzer |
| 2016/0209648 A1 | 7/2016 | Haddick et al. |
| 2016/0209657 A1 | 7/2016 | Popovich et al. |
| 2016/0234485 A1 | 8/2016 | Robbins et al. |
| 2016/0238844 A1 | 8/2016 | Dobschal |
| 2016/0266387 A1 | 9/2016 | TeKolste et al. |
| 2016/0314564 A1 | 10/2016 | Jones et al. |
| 2016/0341964 A1 | 11/2016 | Amitai |
| 2016/0370693 A1 | 12/2016 | Watanabe |
| 2017/0003504 A1 | 1/2017 | Vallius et al. |
| 2017/0017095 A1 | 1/2017 | Fricker et al. |
| 2017/0045743 A1 | 2/2017 | Dobschal et al. |
| 2017/0075119 A1 | 3/2017 | Schultz et al. |
| 2017/0122725 A1 | 5/2017 | Yeoh et al. |
| 2017/0242249 A1 | 8/2017 | Wall et al. |
| 2017/0248790 A1* | 8/2017 | Cheng .................. G02B 27/141 |
| 2017/0343822 A1 | 11/2017 | Border et al. |
| 2018/0033562 A1 | 2/2018 | Chung et al. |
| 2018/0045960 A1 | 2/2018 | Palacios et al. |
| 2018/0101013 A1* | 4/2018 | Moore .................. G06F 3/013 |
| 2018/0188631 A1 | 7/2018 | Lu et al. |
| 2018/0210202 A1* | 7/2018 | Danziger .................. H04N 5/74 |
| 2018/0292592 A1* | 10/2018 | Danziger ................ G02B 27/28 |
| 2018/0335629 A1 | 11/2018 | Cheng et al. |
| 2019/0008667 A1 | 1/2019 | Longo |
| 2019/0018247 A1 | 1/2019 | Gao et al. |
| 2019/0018748 A1 | 1/2019 | Shani et al. |
| 2019/0026864 A1 | 1/2019 | Chen et al. |
| 2019/0036940 A1 | 1/2019 | Balakrishnan et al. |
| 2019/0037712 A1 | 1/2019 | Kim et al. |
| 2019/0037718 A1 | 1/2019 | Shapiro et al. |
| 2019/0064519 A1 | 2/2019 | Ben-Asher et al. |
| 2019/0086674 A1 | 3/2019 | Sinay et al. |
| 2019/0187482 A1 | 6/2019 | Lanman |
| 2019/0221988 A1* | 7/2019 | Villeneuve ............ G01S 7/4804 |
| 2019/0222830 A1 | 7/2019 | Edwin et al. |
| 2019/0322382 A1 | 10/2019 | Mackin |
| 2020/0027855 A1 | 1/2020 | Lee et al. |
| 2020/0150330 A1* | 5/2020 | Danziger ............. G02B 6/0028 |
| 2020/0159030 A1 | 5/2020 | Ayres et al. |
| 2020/0209667 A1* | 7/2020 | Sharlin ............. G02F 1/136277 |
| 2020/0241308 A1* | 7/2020 | Danziger ................ G06V 40/19 |
| 2020/0249481 A1* | 8/2020 | Danziger ........... G02B 27/0081 |
| 2020/0261279 A1 | 8/2020 | Weidman et al. |
| 2021/0033774 A1* | 2/2021 | Tanaka ................ G02B 27/0172 |
| 2021/0165142 A1* | 6/2021 | Blomstedt .......... G02B 27/0172 |
| 2022/0004014 A1 | 1/2022 | Ronen et al. |
| 2022/0018760 A1 | 1/2022 | Spartz et al. |
| 2022/0035021 A1 | 2/2022 | Billaud et al. |
| 2022/0035758 A1 | 2/2022 | Hanna et al. |
| 2022/0107499 A1 | 4/2022 | Amitai |
| 2022/0357498 A1 | 11/2022 | Fuchs et al. |

FOREIGN PATENT DOCUMENTS

| | | |
|---|---|---|
| JP | 861140925 | 6/1986 |
| JP | 2006145644 | 6/2006 |
| JP | 2012123936 | 6/2012 |
| JP | 2017108370 | 6/2017 |
| WO | 2013145147 | 10/2013 |
| WO | 2022120262 | 6/2022 |

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

C.B. Owen et al"Display-relative calibration for optical see-through head-mounted displays" Published in: Third IEEE and ACM International Symposium on Mixed and Augmented Reality—https://ieeexplore.ieee.org/document/1383044.

Mukawa H "A full-color eyewear display using planar waveguides with reflection volume holograms" , Article in Information Display • Mar. 2009 DOI: 10.1002/j.2637-496X.2009.tb00066.x.

* cited by examiner

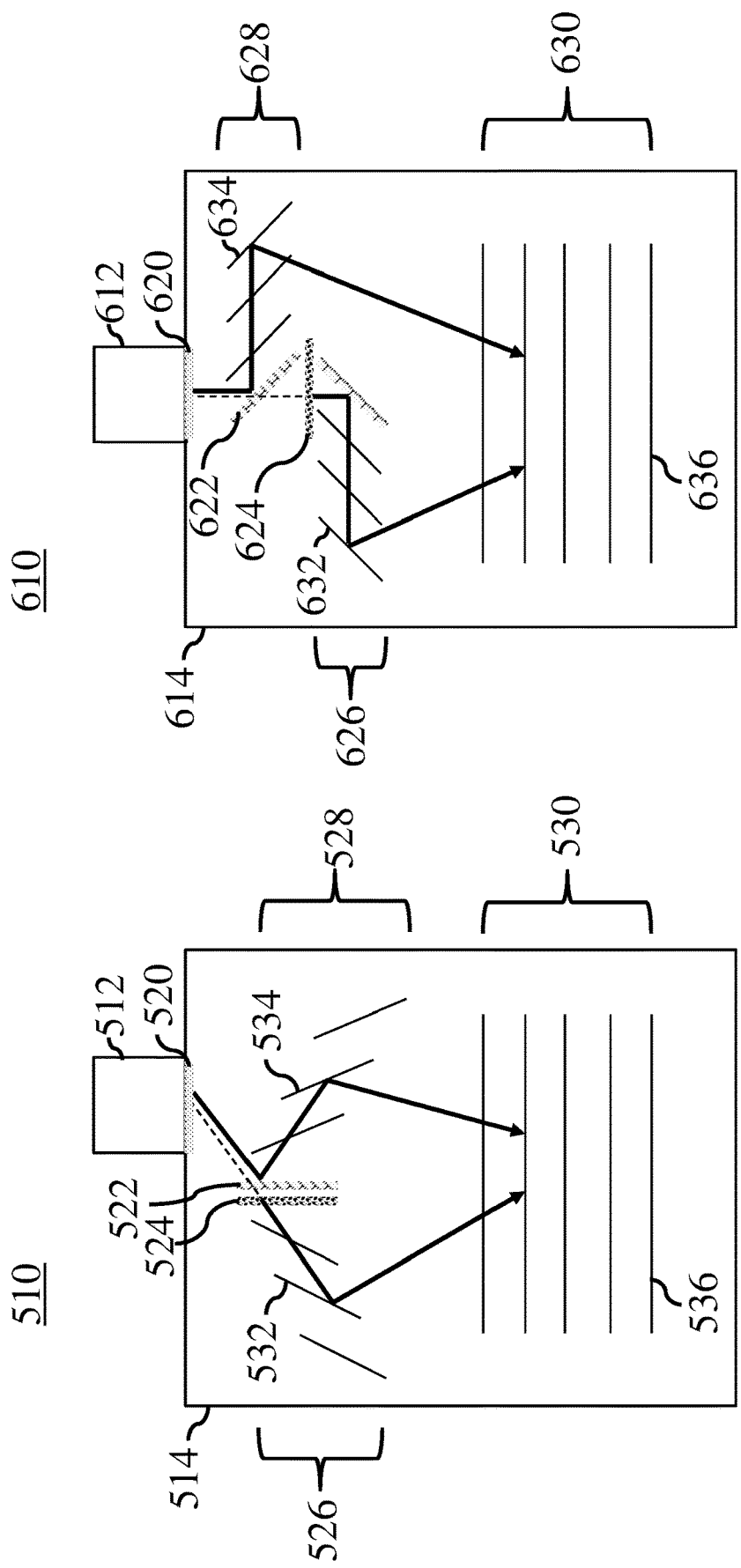

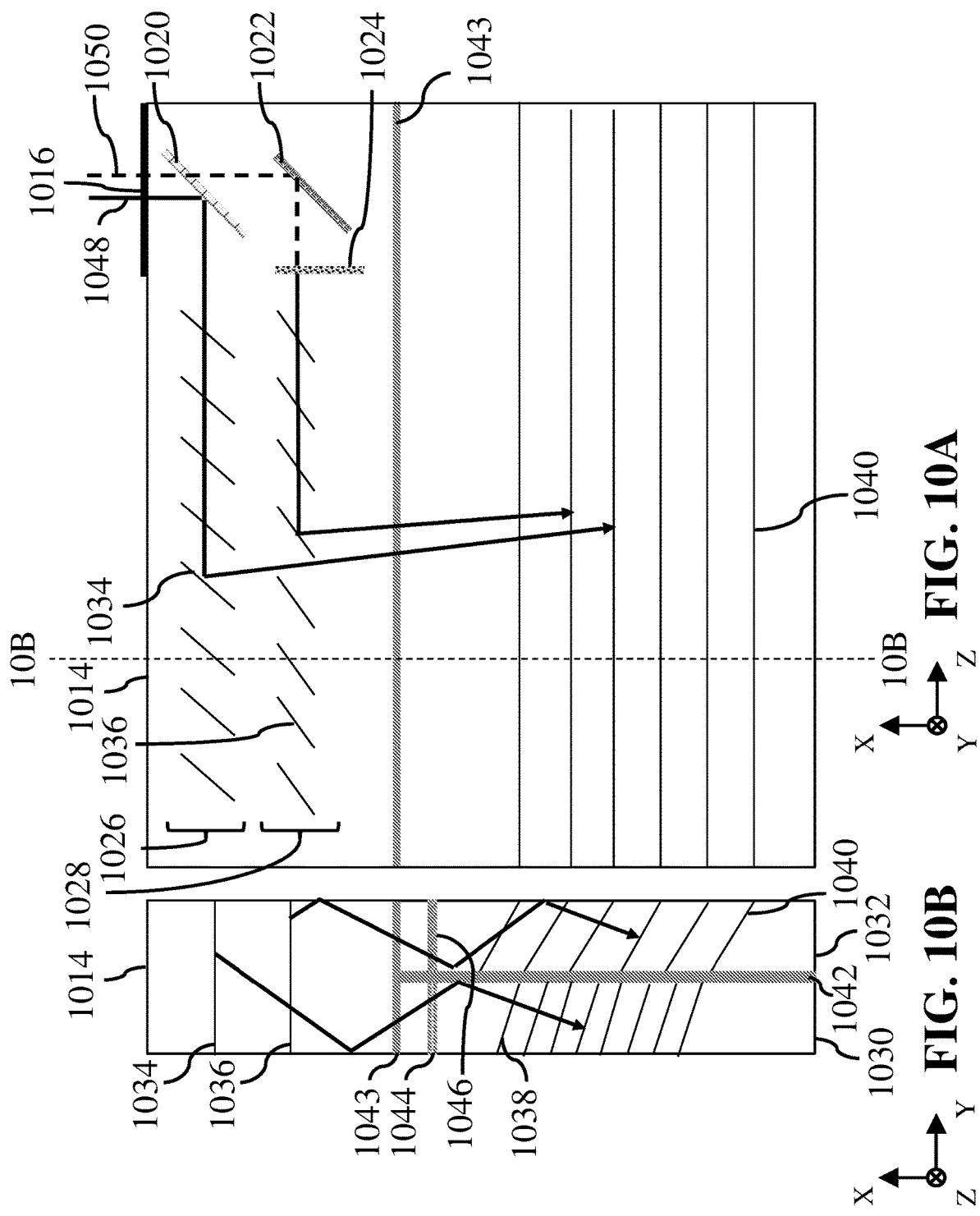

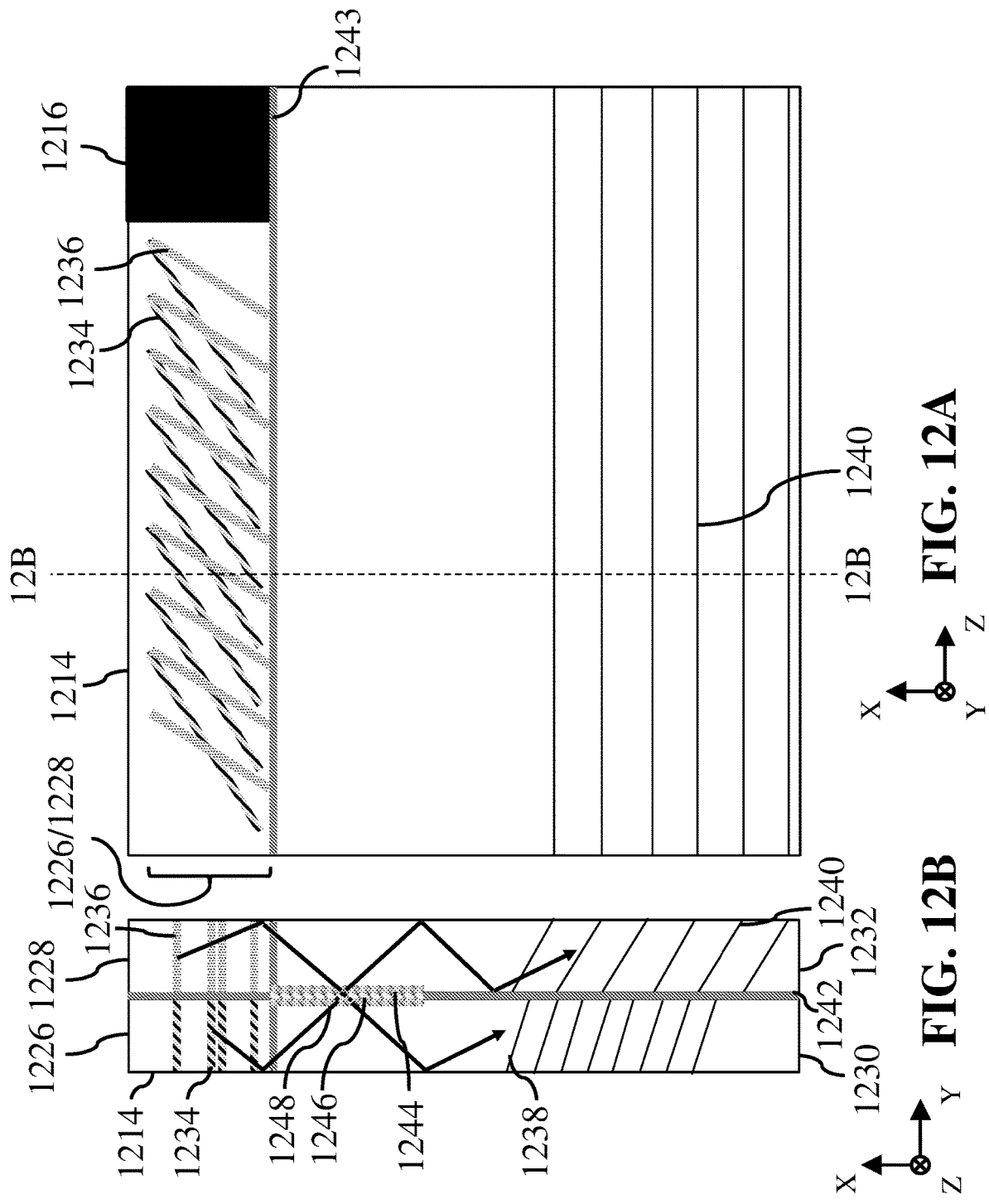

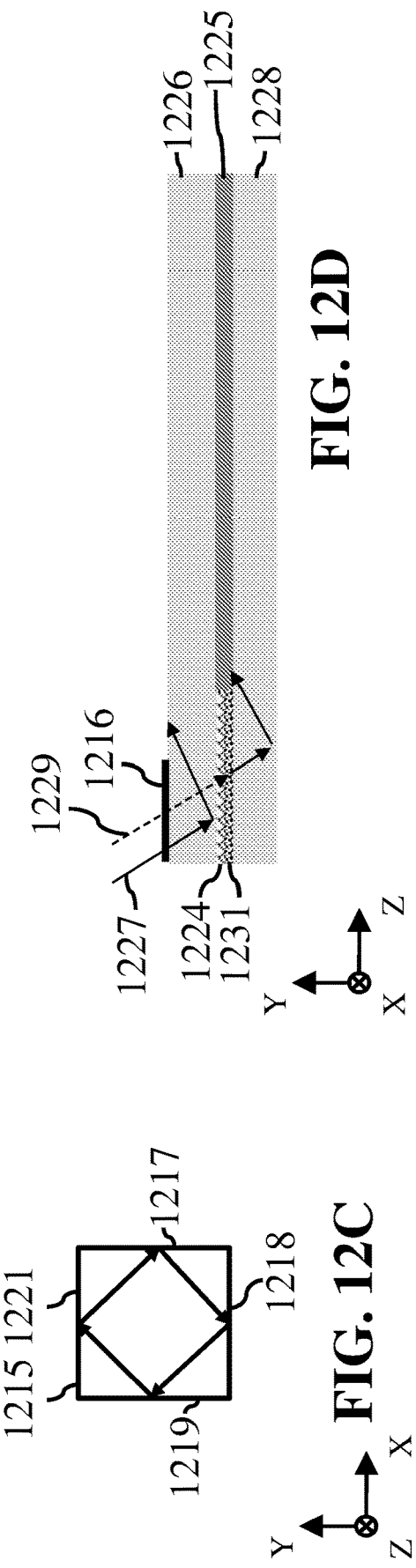

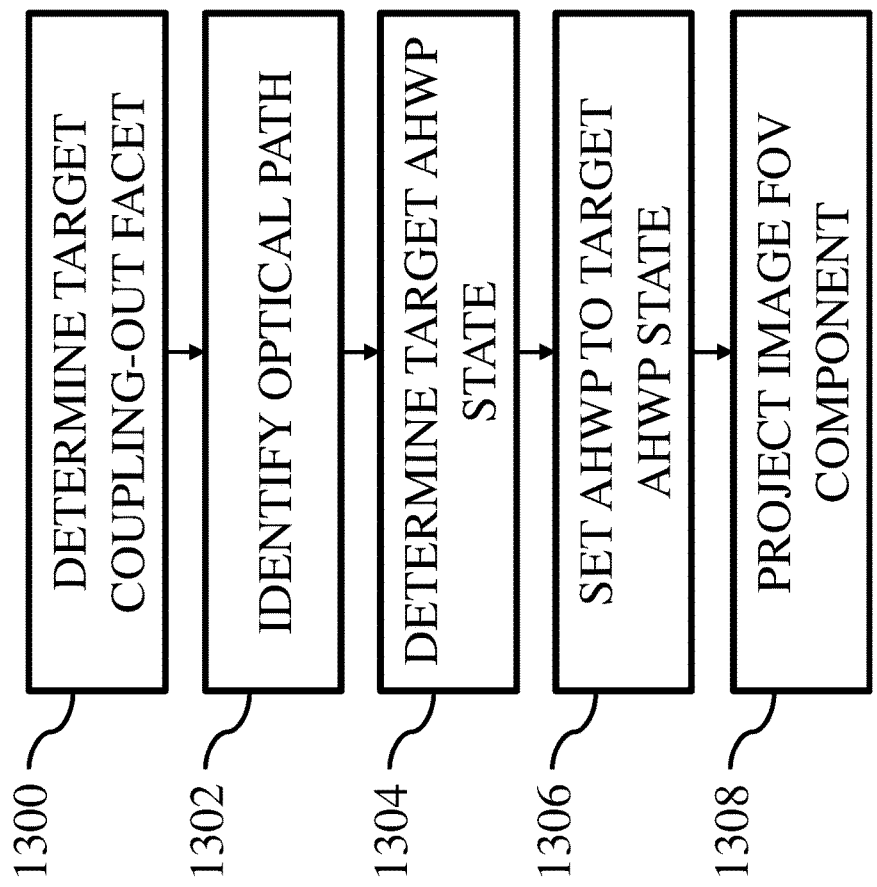

ACTIVE OPTICAL ENGINE

BACKGROUND OF THE SPECIFICATION

The present disclosure relates to optical systems. More specifically, the present disclosure relates to optical systems having an active optical engine that may, in some embodiments, be used in near-eye display systems.

In optical systems such as near-eye display systems a projector typically provides a field of view (FOV) of an image to an eye of a user. In order to increase the FOV for an optical system, the size, weight, components, configuration and power consumption of the projector typically need to also be increased. In the case of small, lightweight, energy efficient optical systems such as, e.g., head-mounted devices (HMDs), smart glasses, etc., such increases in the projector may not be viable.

SUMMARY

In an embodiment, an apparatus is disclosed that comprises at least one processor. The at least one processor is configured to determine a target coupling-out facet, identify an optical path to the target coupling-out facet, identify an active wave plate corresponding to the optical path, determine a target state of the active wave plate that corresponds to the optical path, set the active wave plate to the identified target state and cause a projection device to project a light beam comprising an image field of view component along the identified optical path.

In some embodiments, a method is disclosed comprising determining a target coupling-out facet, identifying an optical path to the target coupling-out facet, identifying an active wave plate corresponding to the optical path, determining a target state of the active wave plate that corresponds to the optical path, setting the active wave plate to the identified target state and causing a projection device to project a light beam comprising an image field of view component along the identified optical path.

In an embodiment, an optical system is disclosed. The optical system comprises a projection optics device that is configured to output a light beam having a first polarization and an active wave plate that is configured to transition between an activated state and a deactivated state. The active wave plate is configured to convert the light beam output by the projection optics device from the first polarization to a second polarization when in the activated state. The optical system further comprises a PBS that is configured to redirect light beams having the first polarization and to allow light beams having the second polarization to pass therethrough, a first LOE component comprising a first plurality of facets, a second LOE component comprising a second plurality of facets and a third LOE component comprising a third plurality of facets. The first LOE component and the third LOE component define a first optical path from the projection optics device via the active wave plate and the PBS and the second LOE component and the third LOE component define a second optical path from the projection optics device via the active wave plate and the PBS.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 6 is a schematic diagram of an example image projection assembly of the optical system of FIG. 1A according to another embodiment.

FIG. 7 is a schematic diagram of an example image projection assembly of the optical system of FIG. 1A according to another embodiment.

FIGS. 10A and 10B are schematic diagrams of an example LOE that is configured to output the image FOV components of FIG. 9 according to an embodiment where FIG. 10B is taken along section line 10B-10B of FIG. 10A.

FIG. 11B is taken along section line 11B-11B of FIG. 11A.

FIGS. 12A-12D are schematic diagrams of another example LOE that is configured to output the image FOV components of FIG. 9 according to another embodiment where FIG. 12B is taken along section line 12B-12B of FIG. 12A.

FIG. 13 is a flow diagram of an example process according to an embodiment.

DETAILED DESCRIPTION

In optical systems such as near-eye display systems, light beams are output from a display system to a target surface such as the eye of a user that is in close proximity to the display system. As the use of such near-eye display systems has increased, the demand for better and more comfortable near-eye display systems has also increased. However, reducing the size and weight of near-eye displays such as, e.g., head-mounted displays (HMDs) and smart glasses, while also providing better geometries, a wider field of view (FOV), longer battery life, day-time clear augmented images and other improvements in the near-eye display systems is challenging. For example, increasing the size of the FOV typically requires a corresponding increase in the size, weight, and power consumption of the projector which often leads to a bulky form factor.

Illustrative embodiments disclose optical systems and methods that allow the FOV to be expanded without significantly increasing the size, weight, and power consumption of the projector, thereby enabling a wide, immersive FOV, while keeping projector FOV demands small.

In the figures, X, Y and Z axes are provided for clarity and ease of reference.

Figure 1A:
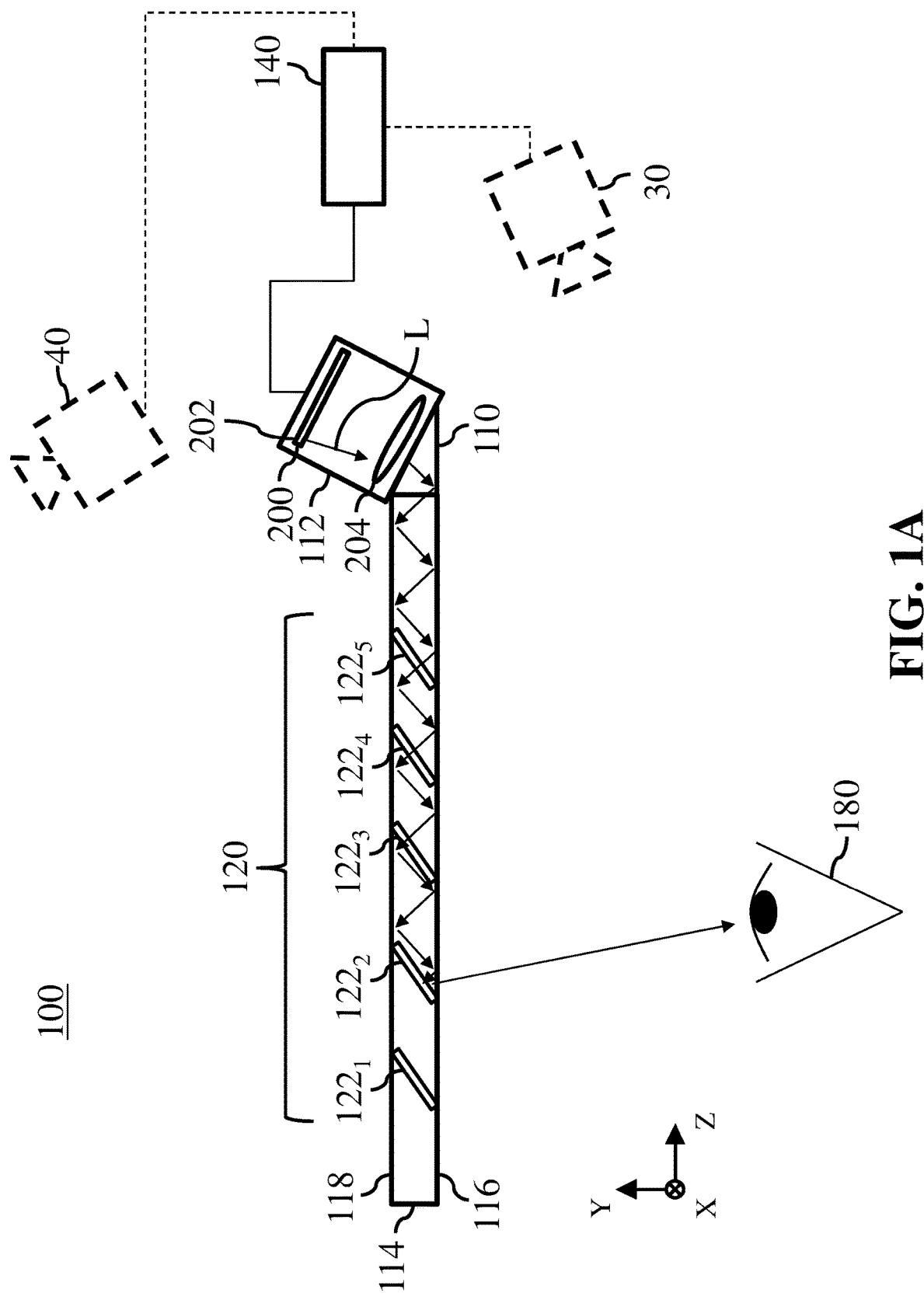
FIG. 1A is a schematic diagram of an example optical system according to an embodiment.
Figure 1B:
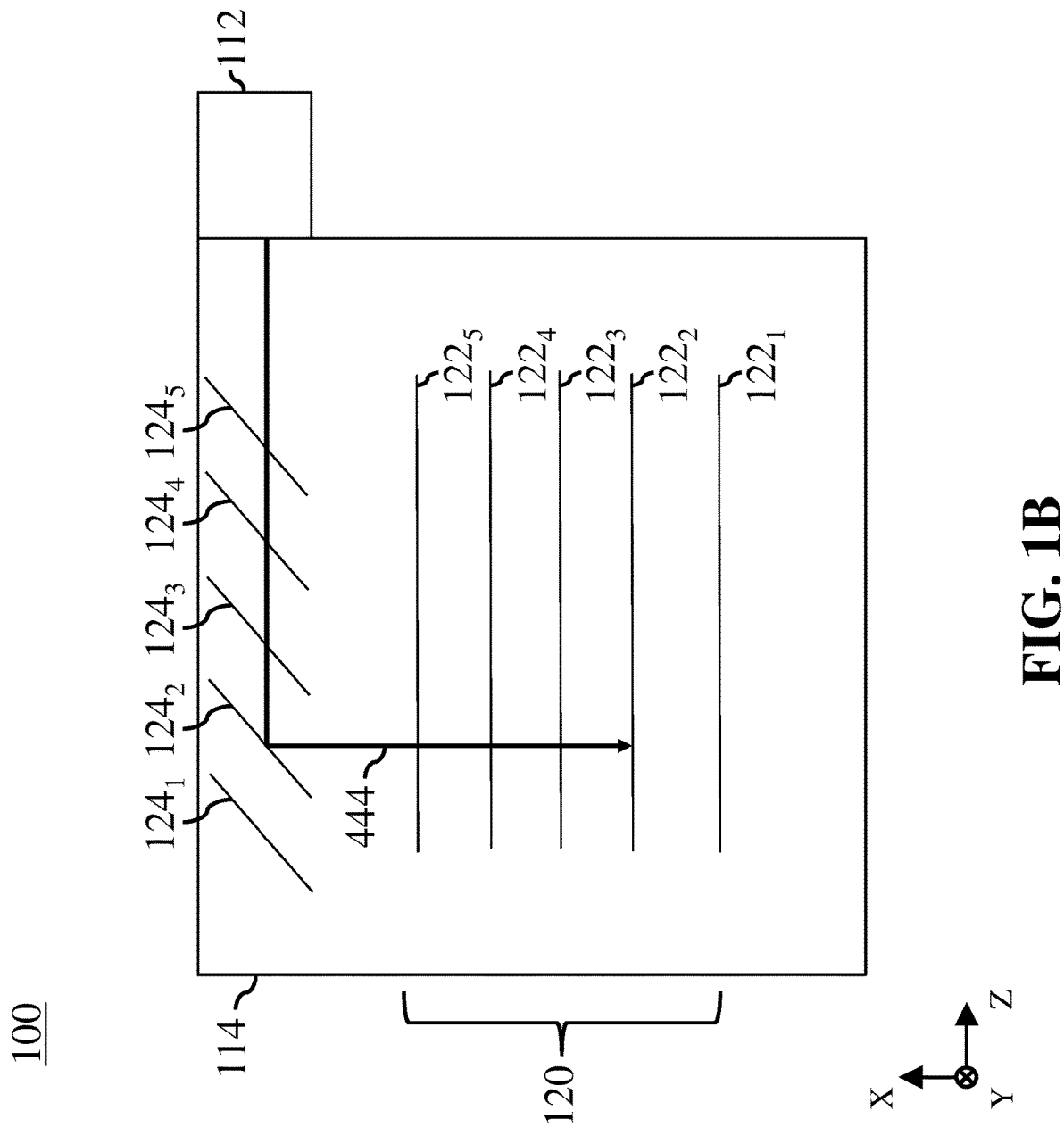
FIG. 1B is a schematic diagram of an example image projection assembly of the optical system of FIG. 1A having 2D pupil expansion according to an embodiment.

With reference to FIGS. 1A and 1B, an example optical system 100 is described. Optical system 100 comprises an image projection assembly 110 and a controller 140. In some embodiments, optical system 100 may also comprise one or more of an eye tracking system 30 and a light source detection system 40.

Controller 140 comprises a computing device having one or more processing devices, memory or other components. For example, controller 140 may comprise a central processing unit (CPU), field-programmable gate array (FPGA), microcontroller, dedicated circuitry or any other components. Controller 140 is configured to control a projection optics device (to be described below) to generate and output images to a light-guide optical element (LOE) for projection to an eye as will be described in more detail below.

In some embodiments, controller 140 may be integrated into image projection assembly 110 or integrated into a device comprising image projection assembly 110 such as, e.g., glasses, a head-mounted display or another device. In some embodiments, controller 140 may be located remote from image projection assembly 110. For example, image projection assembly 110 may comprise a wired or wireless communication device that is configured to communicate with controller 140. As an example, controller 140 may be included as part of a mobile device, or other computing device that is separate from image projection assembly 110 or a device including image projection assembly 110.

Eye tracking system 30 is optional and is configured to track the location of the pupil of an eye 180 of a user and provide corresponding location information to controller 140. In some embodiments, eye tracking system 30 may comprise, for example, a camera or other device that may be configured to track a location of the pupil or generate location information that may be utilized to determine a location of the pupil. In some embodiments, controller 140 may utilize the location information to provide the image FOV to those facets that correspond to the location of the pupil.

Light source detection system 40 is optional and is configured to detect light sources that may impact optical system 100, e.g., the sun, streetlamps, headlights or other light sources, and to provide corresponding information to controller 140, e.g., a direction of the light source, intensity of the light source or any other information about the light source. As an example, light source detection system 40 may comprise a camera, infrared detector or any other device that is configured to detect light sources external to optical system 100 or to generate information that may be utilized by controller 140 to identify and determine the characteristics of a light source such as, e.g., the direction, intensity or any other information about the light source.

Image projection assembly 110 comprises a projection optics device (POD) 112 and a light-guide optical element (LOE) 114 and is configured to utilize 1-dimensional (1D), or 2-dimensional (2D) pupil expansion to project an image onto an eye 180 of the user. An example of LOE 114 with 2D pupil expansion is shown in FIG. 1B.

POD 112 comprises an image generator 200, collimating optics 204 or other components that may be included in an image projection assembly such as, e.g., a spatial light modulator (SLM). Some or all of these components may be arranged on surfaces of one or more polarizing beamsplitter (PBS) cubes or other prism arrangements in some embodiments. Image generator 200 comprises one or more components that provide illumination, e.g., light beams, laser beams or other forms of illumination, that correspond to an image to be projected onto eye 180 of the user. For example, image generator 200 comprises light emitting diodes (LEDs), an organic light emitting diode (OLED) display element, a backlit liquid crystal display (LCD) panel, a micro-LED display, a digital light processing (DLP) chip, a liquid crystal on silicon (LCOS) chip or other components.

In a case where POD 112 comprises an SLM (not shown), the SLM may be implemented as a light emitting SLM comprising components such as, e.g., an OLED display element, a backlit LCD panel, a micro-LED display, a DLP chip or another light emitting component, or may be implemented as a reflective SLM comprising components such as, e.g., an LCOS chip. A beam splitter cube block may be interposed between collimating optics and the SLM to allow delivery of illumination to the surface of the SLM. The SLM may be configured to modulate the projected intensity of each pixel of the illumination to generate the image. For example, the SLM may provide a light beam that is divergent in the plane of LOE 114, e.g., the plane of the major LOE surfaces 116 and 118 described below, from each pixel of the display.

Alternatively, POD 112 may include a scanning arrangement, e.g., a fast-scanning mirror, which scans illumination from a light source across an image plane of POD 112 while the intensity of the illumination is varied synchronously with the motion on a pixel-by-pixel basis to project a desired intensity for each pixel.

POD 112 also optionally comprises a coupling-in arrangement for injecting the illumination of the image into LOE 114, e.g., a coupling-in reflector, angled coupling prism or any other coupling-in arrangement. In some embodiments, coupling between POD 112 and LOE 114 may include a direct coupling, e.g., POD 112 may be in contact with a portion of LOE 114, or may include a coupling via an additional aperture expanding arrangement for expanding the dimension of the aperture across which the image is injected in the plane of LOE 114.

LOE 114 comprises a waveguide including first and second parallel major LOE surfaces 116 and 118 and edges that are not optically active. In illustrative embodiments, the various waveguides described herein may comprise geometric waveguides, diffractive waveguides or any other type of waveguide. LOE 114 also comprises a coupling-out arrangement 120 that is configured to direct the illumination out of LOE 114 for projection onto eye 180 of the user. In some embodiments, coupling-out arrangement 120 is illustrated as a plurality of parallel surfaces, also referred to herein as facets 122₁, 122₂, 122₃, 122₄ and 122₅, that are arranged within LOE 114 at an oblique angle to major LOE surfaces 116 and 118 of LOE 114. Facets 122₁, 122₂, 122₃, 122₄ and 122₅ may also be referred to herein collectively as facets 122. Any of facets 122₁, 122₂, 122₃, 122₄ and 122₅ may also be referred to herein individually as facet 122. While five facets 122₁, 122₂, 122₃, 122₄ and 122₅ are illustrated in FIG. 1A, in an illustrative embodiment, LOE 114 may alternatively comprise a larger number of facets 122 or a smaller number of facets 122 in other embodiments. With reference to FIG. 1B, in the embodiment having 2D pupil expansion, a second set of facets 1241, 1242, 1243, 1244 and 124s are utilized to guide light from POD 112 toward facets 122. Any of facets 1241, 1242, 1243, 1244 and 124s may also be referred to herein individually as facet 124. While five facets 1241, 1242, 1243, 1244 and 124s are illustrated in FIG. 1B, in an illustrative embodiment, LOE 114 may alternatively comprise a larger number of facets 124 or a smaller number of facets 124 in other embodiments.

In some embodiments, each facet 122 and 124 is a semi-reflective facet that is configured to couple out light beams having particular angles of propagation in LOE 114 to the eye 180. For example, in some embodiments, each facet 122 and 124 may be configured to couple-out light beams having different angles of propagation in LOE 114.

In some embodiments, one or more of facets 122 and 124 may be selectively activatable between a state in which the facet 122 has a high transmissivity of light and a state in which the facet 122 has a high reflectivity of light. As an example, in some embodiments, the facet 1221 may be activated to have 100% reflectivity and 0% transmissivity and may be deactivated to have 0% reflectivity and 100% transmissivity. In some embodiments, the amount of reflectivity and transmissivity may be adjustable for each facet 122 such that, for example, facet 1221 may be adjusted to have partial reflectivity and partial transmissivity, e.g., have 25% reflectivity and 75% transmissivity, 50% reflectivity and 50% transmissivity, 75% reflectivity and 25% transmissivity or any other amount of reflectivity and transmissivity. As an example, controller 140 may be configured to selectively activate and adjust the reflectivity and transmissivity of each facet 122. In some embodiments, controller 140 may be configured to selectively activate and adjust the reflectivity and transmissivity of each facet 122 for particular angles or ranges of angles of light beams, e.g., high transmissivity for some angles or a range of angles of light beams and high reflectivity for other angles or ranges of angles of light beams.

As shown in FIG. 1A, for example, light beams L travel through LOE 114 towards facets 122 by reflecting off major LOE surfaces 116 and 118 and in the embodiment of FIG. 1B, towards facets 124. For example, major LOE surfaces 116 and 118 may provide total internal reflection (TIR) for any light beams L traveling through LOE 114. When light beam L encounters a facet 122 or 124 at the right angle, or an active facet 122 or 124, light beam L is redirected by the facet 122 or 124. For example, light encountering facets 122 is redirected out of LOE 114, e.g., towards eye 180, while light encountering facets 124 is redirected toward facets 122.

Figure 2:
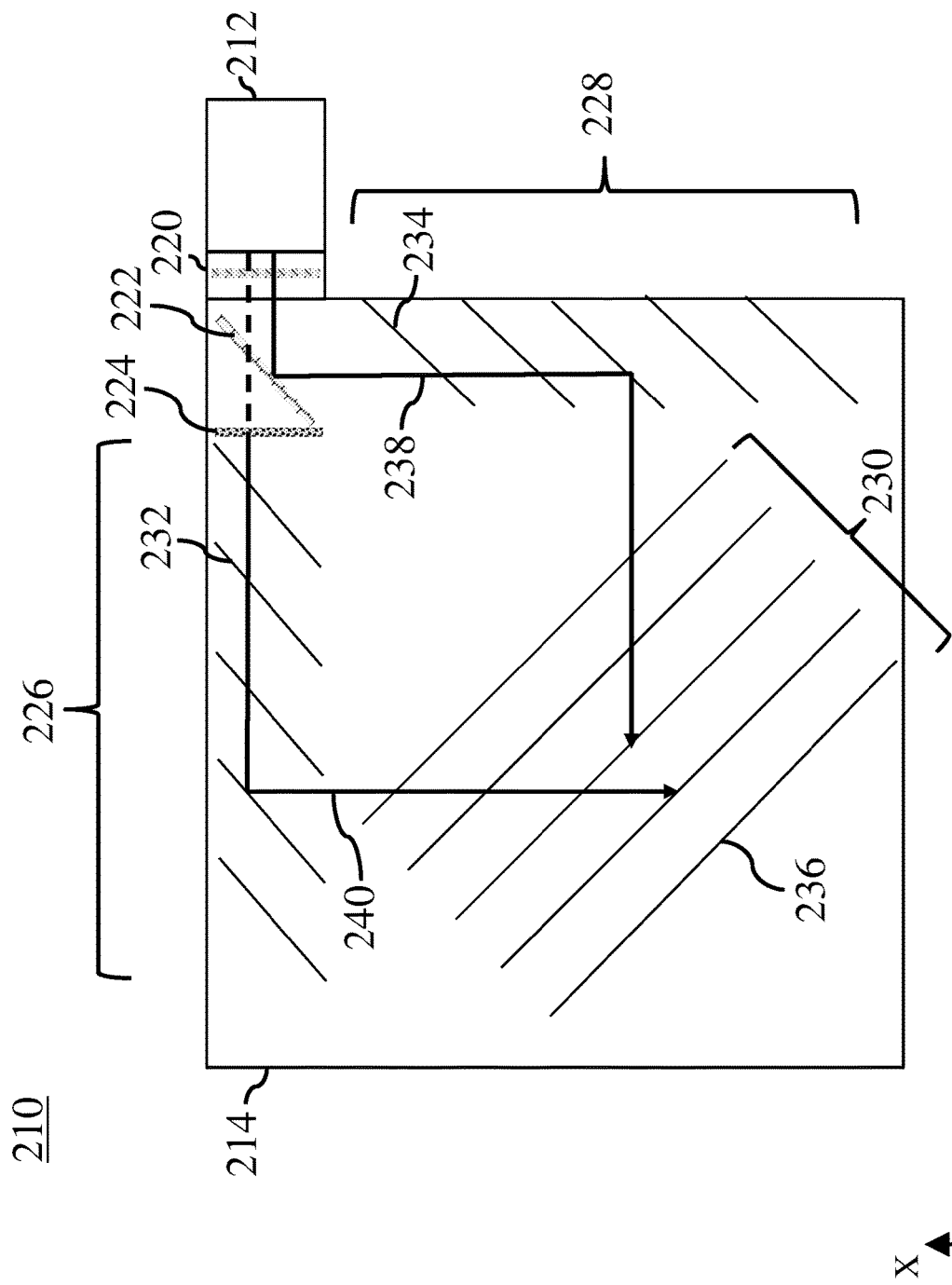
FIG. 2 is a schematic diagram of an example image projection assembly of the optical system of FIG. 1A according to an embodiment.

With reference to FIG. 2, an illustrative embodiment of an image projection assembly 210 of optical system 100 will be described. Image projection assembly 210 may comprise similar features to image projection assembly 110 including, e.g., a POD 212, an LOE 214, facets, diffractive components, holographic components or other similar components, and may replace image projection assembly 110 in optical system 100. Image projection assembly 210 may be utilized to actively expand the available FOV output by POD 212. POD 212 may comprise a polarized POD that is configured to output light beams one of the P and S polarizations. As an example, in an illustrative embodiment, POD 212 may be configured to output light beams having an S polarization.

An active half wave plate (AHWP) 220 such as, e.g., a liquid crystal plate or other active wave plate that may be controlled by controller 140 (FIG. 1A), is disposed between POD 212 and LOE 214 and is configured to change a polarity of the light beam that is projected by POD 212, e.g., from an S polarization to a P polarization when activated by controller 140 or vice versa. In an illustrative embodiment, AHWP 220 is configured to change the polarity from an S polarization to a P polarization when activated. In alternative embodiments, POD 212 may comprise AHWP 220 or LOE 214 may comprise AHWP 220.

LOE 214 comprises a polarizing beam splitter (PBS) 222, a half wave plate (HWP) 224, an LOE component 226, an LOE component 228 and an LOE component 230.

PBS 222 is configured to allow light beams having one of the P and the S polarization to pass through to LOE component 226 while redirecting light beams having the other of the P and S polarization to LOE component 228. In an illustrative embodiment, PBS 222 is configured to allow light beams having P polarization to pass through to LOE component 226 and to redirect light beams having S polarization to LOE component 228. In some embodiments, PBS 222 may comprise 97% reflected S (Rs), 0.01% transmitted S (Ts), 96% transmitted P (Tp) and 0.1% reflected P (Rp). In other embodiments, PBS 222 may comprise any other reflectance or transmittance values for P and S polarized light beams.

HWP 224 is disposed between PBS 222 and LOE component 226 and is configured to convert light beams that pass-through PBS 222 from one polarization to another. For example, in an illustrative embodiment, HWP 224 is configured to convert a light beam having P polarization that passes through PBS 222 to a light beam having S polarization.

LOE component 226 comprises facets 232 that are configured to direct light beams that pass-through PBS 222 and HWP 224 toward LOE component 230. In some embodiments, LOE component 226 comprises similar components to LOE 114, e.g., first and second major LOE surfaces 116 and 118 and facets 122.

LOE component 228 comprises facets 234 that are configured to direct light beams that are redirected by PBS 222 toward LOE component 230. In some embodiments, LOE component 228 comprises similar components to LOE 114, e.g., first and second major LOE surfaces 116 and 118 and facets 122.

LOE component 230 comprises facets 236 that are configured to direct light beams that are received from LOE components 226 and 228 toward eye 180 (FIG. 1A) in a similar manner to LOE 114. In some embodiments, LOE component 230 comprises similar components to LOE 114, e.g., first and second major LOE surfaces 116 and 118 and facets 122.

In some embodiments, LOE component 226, LOE component 228 and LOE component 230 are co-planar with major LOE surfaces 116 and 118.

By introducing AHWP 220 between POD 212 and LOE 214, light beams output by POD 212 may be switched between P polarization and S polarization as a function of time. In FIG. 2, light beams having S polarization are depicted as solid lines while light beams having P polarization are depicted as dashed lines.

For example, when AHWP 220 is deactivated, a light beam 238 that has S polarization will pass through AHWP 220 without being converted and will be reflected off of PBS 222 towards LOE component 228. Light beam 238 then reflects from facets 234 towards LOE component 230 and reflects from facets 236 towards eye 180 (FIG. 1A).

When AHWP 220 is activated, a light beam 240 that initially has S polarization will be converted to P polarization as it passes through AHWP 220 and will pass through PBS 222 toward HWP 224 and LOE component 226. Light beam 240 will be converted back to S polarization as it passes through HWP 224 and then will reflect from facets 232 towards LOE component 230. Light beam 240 then reflects from facets 236 towards eye 180 (FIG. 1A).

In FIG. 2, light beams 238 and 240 will eventually reach eye 180 at different angles, dependent on the exit polarization from the projector due to different facet angles of LOE components 226 and 228 and the various optical paths the light beams follow. Since controller 140 (FIG. 1A) is configured to activate AHWP 220 as a function of time, each light beam 238 and 240 may comprise only a portion of the full image. Controller 140 is configured to synchronize between the image generated by POD 212 and the polarization output of AHWP 220 to ensure that the user experiences a complementary image at eye 180.

Figure 3:
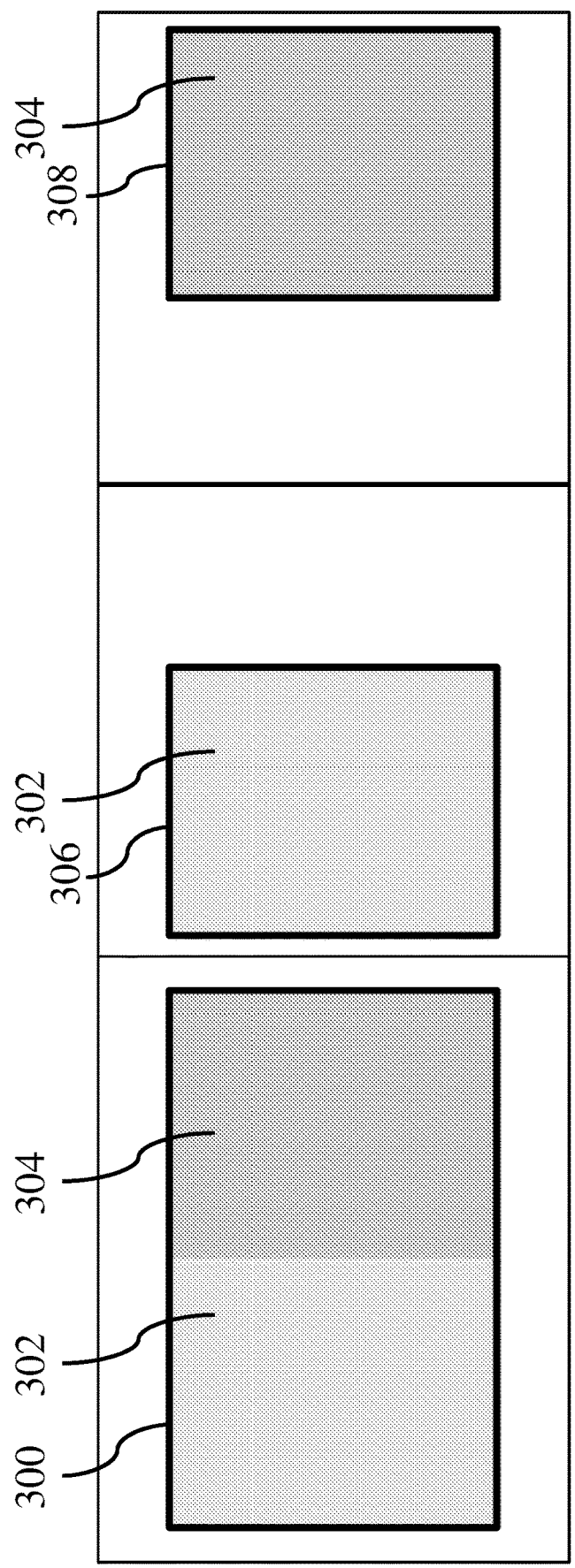
FIG. 3 is a diagram of example image FOV and image FOV components of the optical system of FIGS. 1A and 2 according to an embodiment.

With reference to FIG. 3, a comparison between the image FOVs provided by image projection assembly 110 and image projection assembly 210 is shown. As shown in FIG. 3, an image FOV 300 is output by image projection assembly 110 that comprises image FOV components 302 and 304 as a single image FOV 300. In contrast, half image FOVs 306 and 308, each comprising one of image FOV components 302 and 304, are separately output by image projection assembly 210 as a function of time, e.g., based on the activation of AHWP 220. In some embodiments, image FOV components 302 and 304 may be equal in size. In some embodiments, image FOV components 302 and 304 may have different sizes such that the 'stitching' region between image FOV components 302 and 304 is not in the center of image FOV 300.

Because image projection assembly 110 needs to output a wide image FOV 300, POD 112 has to be configured to generate and support the wide image FOV, possibly requiring larger, heavier, or more power intensive components than POD 212. In addition, LOE 114 may require additional facets, angles, etc., and require more angular space requirements as compared to LOE 214 in order to direct the wide image FOV onto eye 180.

In the case of image projection assembly 210, LOE component 230 couples the image FOV of light beams 238 and 240 out to eye 180. As a function of time, light beams 238 and 240 will be received by LOE component 230 from both LOE component 226 and LOE component 228 and be coupled-out by facets 236 such that eye 180 (FIG. 1A) will experience the same full image FOV 300, while POD 212 only needs to generate part of the FOV angular range at any given time. Since facets 232 and 234 only need to handle part of the image FOV, LOE component 226 and LOE component 228 may have a reduced optical demands and physical size in LOE 214, as compared to the components of LOE 114.

Figure 4:
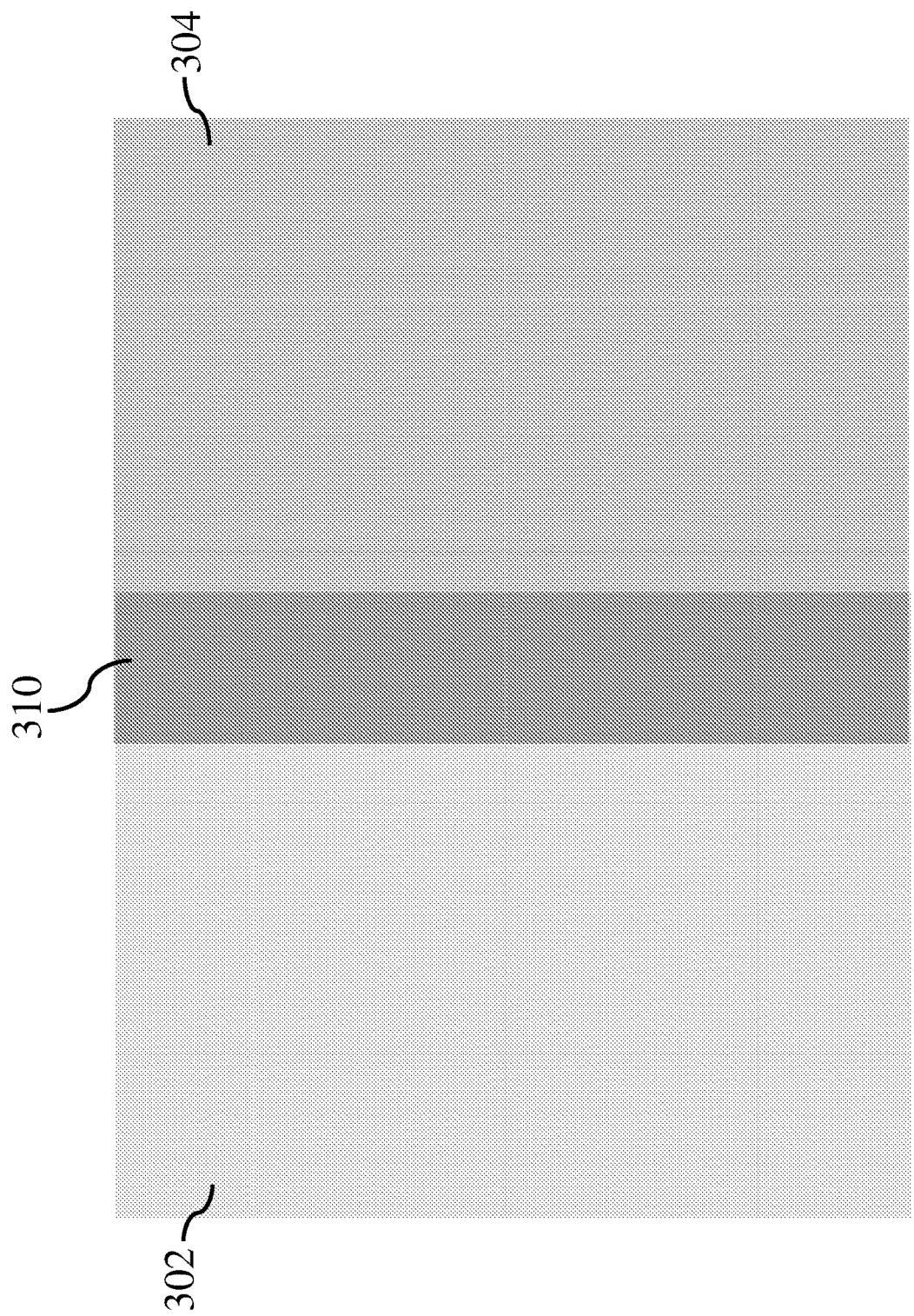
FIG. 4 is a schematic diagram of the example image FOV components of FIG. 3 with the image FOV components overlapping according to an embodiment.

Referring to FIG. 4, in some embodiments, the image FOVs output by image projection assembly 210 may be aligned to create an overlapping image. For example, as seen in FIG. 4, the image FOV components 302 and 304 may be overlapped in a region 310. In some embodiments, the overlapping angular range may comprise a black image for one of image FOV components 302 and 304 in region 310. In other embodiments, both image FOV components 302 and 304 may have the same image in region 310 but with a reduced intensity, e.g., half intensity for each image FOV component. In some embodiments, for example, controller 140 is configured to control the output of image projection assembly 210 to generate image FOV components 302 and 304.

Figure 5:
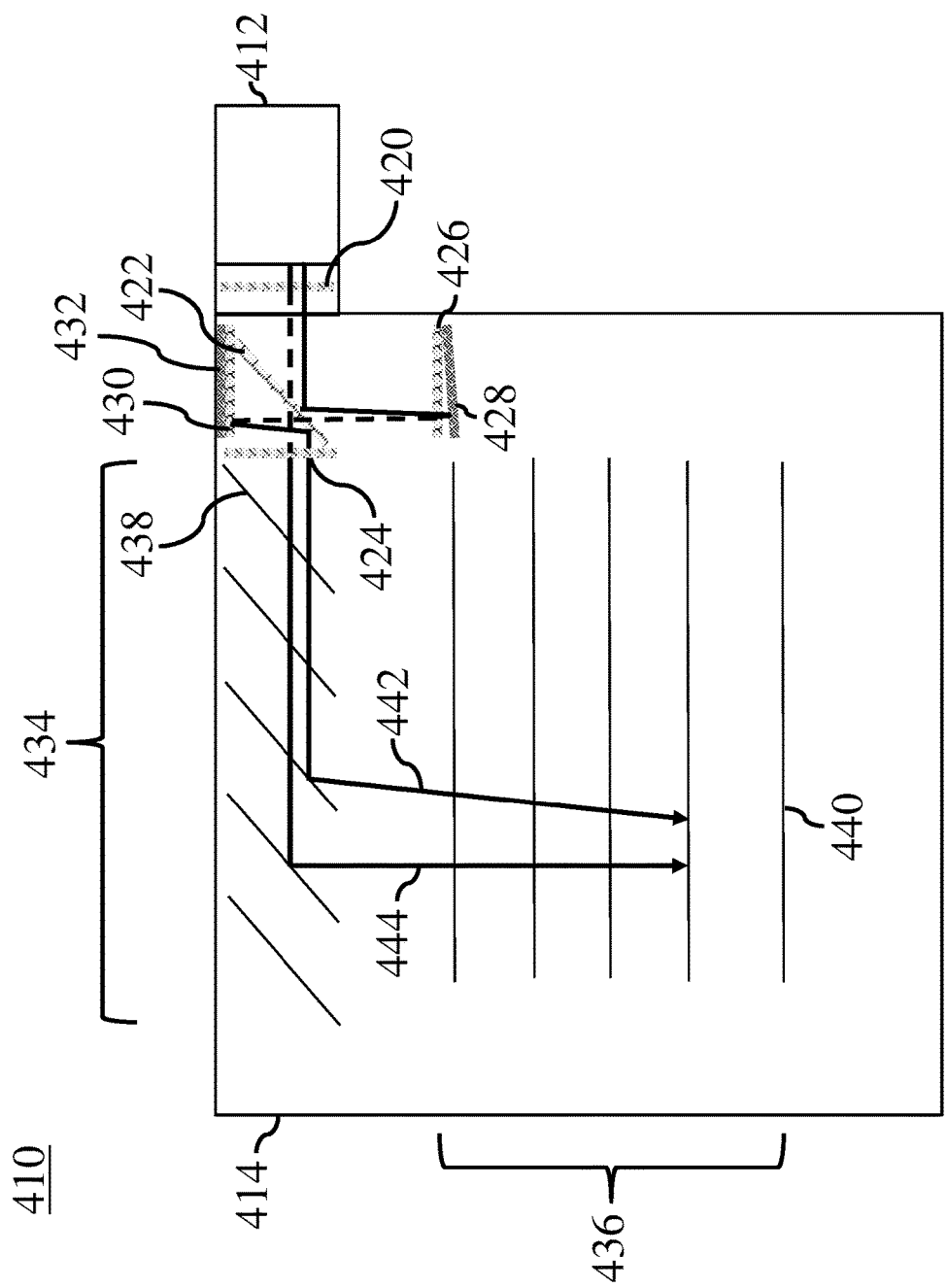
FIG. 5 is a schematic diagram of an example image projection assembly of the optical system of FIG. 1A according to another embodiment.

With reference to FIG. 5, another illustrative embodiment of an image projection assembly 410 of optical system 100 will be described. Image projection assembly 410 may comprise similar features to image projection assembly 210 including, e.g., a POD 412, a LOE 414, facets and or other similar components. Image projection assembly 410 may be utilized to actively expand the available FOV output by POD 412. POD 412 may comprise a polarized POD that is configured to output light beams one of the P and S polarizations. As an example, in an illustrative embodiment, POD 412 may be configured to output light beams having an S polarization.

An AHWP 420 such as, e.g., a liquid crystal plate or other active wave plate that may be controlled by controller 140 (FIG. 1A), is disposed between POD 412 and LOE 414 and is configured to change a polarity of the light beam that is projected by POD 412, e.g., from a S polarization to P polarization when activated by controller 140 or vice versa. In an illustrative embodiment, AHWP 420 is configured to change the polarity from a S polarization to a P polarization when activated. In alternative embodiments, POD 412 may comprise AHWP 420 or LOE 414 may comprise AHWP 420.

LOE 414 comprises a PBS 422, an AHWP 424, a quarter wave plate (QWP) 426, a mirror 428, a QWP 430, a mirror 432, an LOE component 434 and a LOE component 436.

PBS 422 is configured to allow light beams having one of the P and the S polarization to pass through to AHWP 424 and LOE component 434 while redirecting light beams having the other of the P and S polarization to QWP 426. In an illustrative embodiment, PBS 422 is configured to allow light beams having P polarization to pass through to AHWP 424 and to redirect light beams having S polarization to QWP 426. In some embodiments, PBS 422 may comprise 97% reflected S (Rs), 0.01% transmitted S (Ts), 96% transmitted P (Tp) and 0.1% reflected P (Rp). In other embodiments, PBS 422 may comprise any other reflectance or transmittance values for P and S polarized light beams.

AHWP 424 is disposed between PBS 422 and LOE component 434 and is configured to convert light beams that pass-through PBS 422 from one polarization to another. For example, AHWP 424 is configured to function in a similar manner to AHWP 420 and may be activated or deactivated by controller 140 (FIG. 1A).

QWP 426 is disposed between PBS 422 and mirror 428 is configured to convert light beams from one polarization to another. For example, in an illustrative embodiment, QWP 426 is configured to convert a light beam having S polarization to a light beam having P polarization after the beam has passed through QWP 426 twice. For example, a light beam having S polarization that is redirected by PBS 422 toward QWP 426 will pass through QWP 426, be reflected off of mirror 428 and pass through QWP 426 a second time to complete the conversion from S polarization to P polarization. In some embodiments, mirror 428 may be angled relative to mirror 432 to adjust the angle of the light beam.

QWP 430 is disposed between PBS 422 and mirror 432 is configured to convert light beams from one polarization to another. For example, in an illustrative embodiment, QWP 430 is configured to convert a light beam having P polarization to a light beam having S polarization after the beam has passed through QWP 430 twice. For example, a light beam having P polarization that passes through PBS 422 from QWP 426 toward QWP 430 will pass through QWP 430, be reflected off of mirror 432 and pass through QWP 430 a second time to complete the conversion from P polarization to S polarization. The light beam is then directed back toward PBS 422 and redirected by PBS 422 toward AHWP 424 and LOE component 434. In this case, AHWP 424 is deactivated allowing the light beam having S polarization to pass through without being converted.

LOE component 434 comprises facets 438 that are configured to direct light beams that pass through AHWP 424 toward LOE component 436. In some embodiments, LOE component 434 comprises similar components to LOE 114, e.g., first and second major LOE surfaces 116 and 118 and facets 122.

LOE component 436 comprises facets 440 that are configured to direct light beams that are received from LOE component 434 toward eye 180 (FIG. 1A) in a similar manner to LOE 114. In some embodiments, LOE component 436 comprises similar components to LOE 114, e.g., first and second major LOE surfaces 116 and 118 and facets 122.

Similar to image projection assembly 210, by introducing AHWP 420 between POD 412 and LOE 414 in image projection assembly 410, light beams output by POD 412 may be switched between P polarization and S polarization as function of time. In FIG. 5, light beams having S polarization are depicted as solid lines while light beams having P polarization are depicted as dashed lines. In comparison to image projection assembly 210, in image projection assembly 410 replaces LOE component 228 with QWPs 426 and 430 and mirrors 428 and 432 and replaces passive HWP 224 with AHWP 424.

For example, when AHWP 420 is deactivated, a light beam 442 that has S polarization will pass through AHWP 420 without being converted and will be reflected off of PBS 422 toward QWP 426. Light beam 442 passes through QWP 426, reflects off of mirror 428 and passes through QWP 426 again back toward PBS 422. When light beam 442 passes through QWP 426 twice it is converted from S polarization to P polarization. Light beam 442 then passes through PBS 422 toward QWP 430, passes through QWP 430, reflects off of mirror 432 and passes through QWP 430 again back towards PBS 422. When light beam 442 passes through QWP 430 twice it is converted from P polarization to S polarization. Light beam 442 then reflects off of PBS 422 toward AHWP 424 and LOE component 434 and passes through AHWP 424 without being changed since AHWP 424 is deactivated when AHWP 420 is deactivated. Light beam 442 reflects off one of facets 438 toward LOE component 436 and then reflects off one of facets 440 towards eye 180 (FIG. 1A).

When AHWP 420 is activated, a light beam 444 that initially has S polarization will be converted to P polarization as it passes through AHWP 420 and will pass through PBS 422 toward AHWP 424 and LOE component 434. Light beam 444 will be converted back to S polarization as it passes through AHWP 424, since AHWP 424 is also activated when AHWP 420 is activated, and then will reflect off of one of facets 438 toward LOE component 436. Light beam 444 then reflects off one of facets 440 towards eye 180 (FIG. 1A).

In FIG. 5, light beams 442 and 444 will eventually reach eye 180 at different angles, dependent on the exit polarization from the projector due to the various optical paths the light beams follow. Since controller 140 (FIG. 1A) is configured to activate AHWP 420 and AHWP 424 as a function of time, each light beam 442 and 444 may comprise only a portion of the full image. Controller 140 is configured to synchronize between the image generated by POD 412 and the polarization output of AHWPs 420 and 424 to ensure that the user experiences a complementary image at eye 180.

Referring to FIG. 6, another illustrative embodiment of an image projection assembly 510 of optical system 100 will be described. Image projection assembly 510 may comprise similar features to image projection assemblies 210 and 410 including, e.g., a POD 512, an LOE 514, facets and or other similar components. Image projection assembly 510 may be utilized to actively expand the available FOV output by POD 512. POD 212 may comprise a polarized POD that is configured to output light beams one of the P and S polarizations. As an example, in an illustrative embodiment, POD 512 may be configured to output light beams having an S polarization.

An AHWP 520 such as, e.g., a liquid crystal plate or other active wave plate that may be controlled by controller 140 (FIG. 1A), is disposed between POD 512 and LOE 514 and is configured to change a polarity of the light beam that is projected by POD 512, e.g., from an S polarization to a P polarization when activated by controller 140 or vice versa. In an illustrative embodiment, AHWP 520 is configured to change the polarity from an S polarization to a P polarization when activated. In alternative embodiments, POD 512 may comprise AHWP 520 or LOE 514 may comprise AHWP 520.

LOE 514 comprises a PBS 522, a HWP 524, an LOE component 526, an LOE component 528 and an LOE component 530. LOE component 526 comprise facets 532, LOE component 528 comprises facets 534 and LOE component 530 comprises facets 536.

While the components of image projection assembly 510 are configured in a different arrangement than image projection assembly 210 (FIG. 2), the function of POD 512, LOE 514, AHWP 520, PBS 522, HWP 524, LOE component 526, LOE component 528, LOE component 530, facets 532, facets 534 and facets 536 is similar to that described above for POD 212, LOE 214, AHWP 220, PBS 222, HWP 224, LOE component 226, LOE component 228, LOE component 230, facets 232, facets 234 and facets 236 of image projection assembly 210 (FIG. 2).

Referring to FIG. 7, another illustrative embodiment of an image projection assembly 610 of optical system 100 will be described. Image projection assembly 610 may comprise similar features to image projection assemblies 210 and 410 including, e.g., a POD 612, an LOE 614, facets and or other similar components. Image projection assembly 610 may be utilized to actively expand the available FOV output by POD 612. POD 612 may comprise a polarized POD that is configured to output light beams one of the P and S polarizations. As an example, in an illustrative embodiment, POD 612 may be configured to output light beams having an S polarization.

An AHWP 620 such as, e.g., a liquid crystal plate or other active wave plate that may be controlled by controller 140 (FIG. 1A), is disposed between POD 612 and LOE 614 and is configured to change a polarity of the light beam that is projected by POD 612, e.g., from an S polarization to a P polarization when activated by controller 140 or vice versa. In an illustrative embodiment, AHWP 620 is configured to change the polarity from an S polarization to a P polarization when activated. In alternative embodiments, POD 612 may comprise AHWP 620 or LOE 614 may comprise AHWP 620.

LOE 614 comprises a PBS 622, a HWP 624, an LOE component 626, an LOE component 628 and an LOE component 630. LOE component 626 comprise facets 632, LOE component 628 comprises facets 634 and LOE component 630 comprises facets 636.

While the components of image projection assembly 610 are configured in a different arrangement than image projection assembly 210 (FIG. 2), the function of POD 612, LOE 614, AHWP 620, PBS 622, HWP 624, LOE component 626, LOE component 628, LOE component 630, facets 632, facets 634 and facets 636 is similar to that described above for POD 212, LOE 214, AHWP 220, PBS 222, HWP 224, LOE component 226, LOE component 228, LOE component 230, facets 232, facets 234 and facets 236 of image projection assembly 210 (FIG. 2).

Figure 8A:
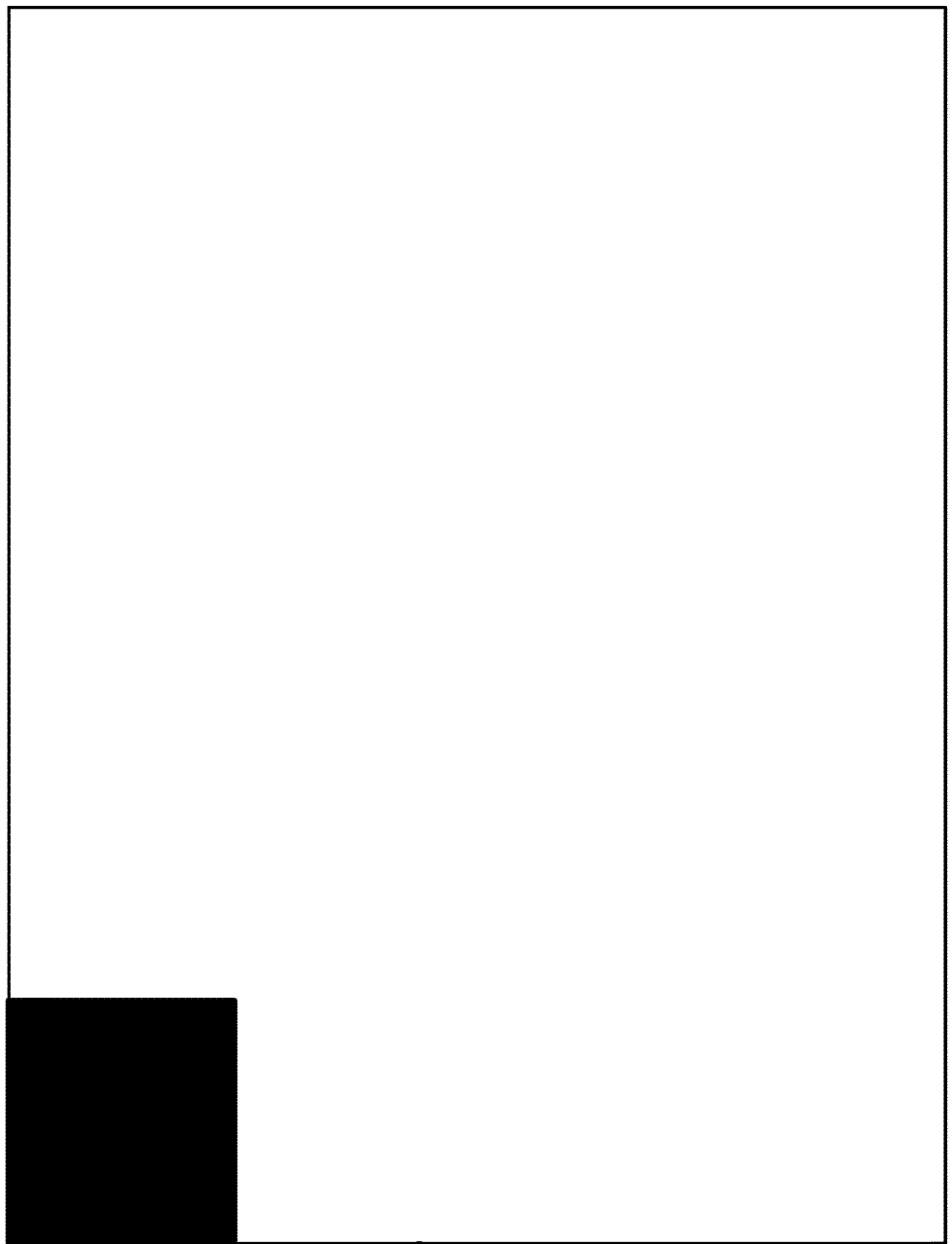
FIGS. 8A-8D are schematic diagrams of example light-guide optical elements (LOEs) having a stacked arrangement according to an embodiment.

With reference to FIGS. 8A-8D, illustrative embodiments of an active stacked optical engine will now be described. As shown in FIG. 8A, an LOE 714 comprises a coupling-in region 716. LOE 714 may replace any of LOEs 114, 214, 414, 514 and 614.

Figure 8B:
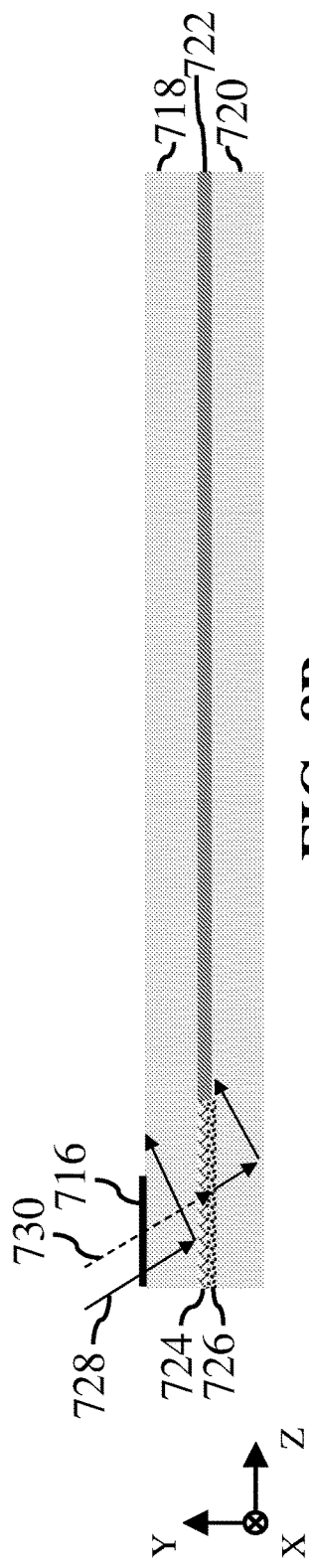

Referring to FIG. 8B, in an illustrative embodiment, LOE components 718 and 720 of LOE 714 are stacked on top of each other and joined together by an adhesive or coating 722 such as, e.g., a low refractive index (RI) glue. In some embodiments, LOE components 718 and 720 may alternatively be joined in a different manner such that an air gap or low RI coating or other coating is disposed between LOE components 718 and 720.

In proximity to coupling-in region 716, a PBS 724 and an HWP 726 are disposed between LOE components 718 and 720. PBS 724 and HWP 726 function in a similar manner to PBS 222 and HWP 224 as described above. As shown in FIG. 8B, light beams enter into the top LOE component 718, e.g., via coupling-in region 716. The light beams may be generated by a POD such as, e.g., PODs 212, 412, 512, 612 or 712. As an example, the light beams have an S or P polarization based on the activation state of an AHWP such as, e.g., AHWP 220, 420, etc., as described in the above embodiments.

If a light beam 728 having an S polarization enters LOE component 718 through coupling-in region 716, light beam 728 will be redirected by PBS 724 and propagate through LOE component 718. If a light beam 730 having a P polarization enters LOE component 718 through coupling-in region 716, light beam 730 passes through PBS 724 and is changed to an S polarization by HWP 726. Light beam 730 then propagates through LOE component 720.

LOE components 718 and 720 comprise facets such as, e.g., facets 232 (FIG. 2) that are configured to redirect light beams toward another LOE such as, e.g., LOE component 230, that is configured to couple-out the light beams to eye 180 (FIG. 1A). In the embodiment of FIG. 8B, each of LOE components 718 and 720 may be responsible for a portion of the image FOV, e.g., half FOV components such as those shown in FIGS. 3 and 4.

Figure 8C:
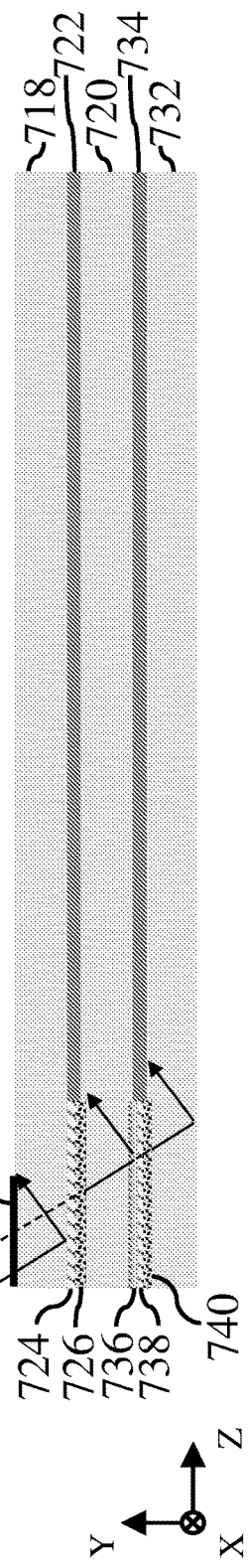

Referring to FIG. 8C, in an illustrative embodiment, LOE components 718 and 720 of LOE 714 are stacked on top of each other and joined together by an adhesive or coating 722 as described above for FIG. 8B. In this embodiment, LOE component 720 is further stacked on an LOE component 732 and joined by an adhesive or coating 734 that is similar to adhesive or coating 722. In proximity to coupling-in region 716, PBS 724 and HWP 726 are disposed between LOE components 718 and 720 and an AHWP 736, a PBS 738 and an HWP 740 are disposed between LOE components 720 and 732.

As shown in FIG. 8C, light beams enter into the top LOE component 718, e.g., via coupling-in region 716. The light beams may be generated by a POD such as, e.g., PODs 212, 412, 512, 612 or 712. As an example, the light beams have an S or P polarization based the activation state of an AHWP such as, e.g., AHWP 220, 420, etc., as described in the above embodiments.

If light beam 728 having an S polarization enters LOE component 718 through coupling-in region 716, light beam 728 will be redirected by PBS 724 and propagate through LOE component 718. If light beam 730 having a P polarization enters LOE component 718 through coupling-in region 716, light beam 730 passes through PBS 724 and is changed to an S polarization by HWP 726.

If AHWP 736 is not active, light beam 730 will pass through AHWP 736 without being changed from S polarization to P polarization and will be redirected by PBS 738 back into LOE component 720. Light beam 730 then propagates through LOE component 720.

If AHWP 736 is active, light beam 730 is converted into P polarization by AHWP 736, passes through PBS 738 and is converted back into S polarization by HWP 740. Light beam 730 then propagates through LOE component 732.

LOE components 718, 720 and 732 comprise facets such as, e.g., facets 232 (FIG. 2) that are configured to redirect light beams toward another LOE such as, e.g., LOE component 230, that is configured to couple-out the light beams to eye 180 (FIG. 1A). In the embodiment of FIG. 8C, each of LOE components 718, 720 and 732 may be responsible for a portion of the image FOV, e.g., one third of the image FOV.

Figure 8D:
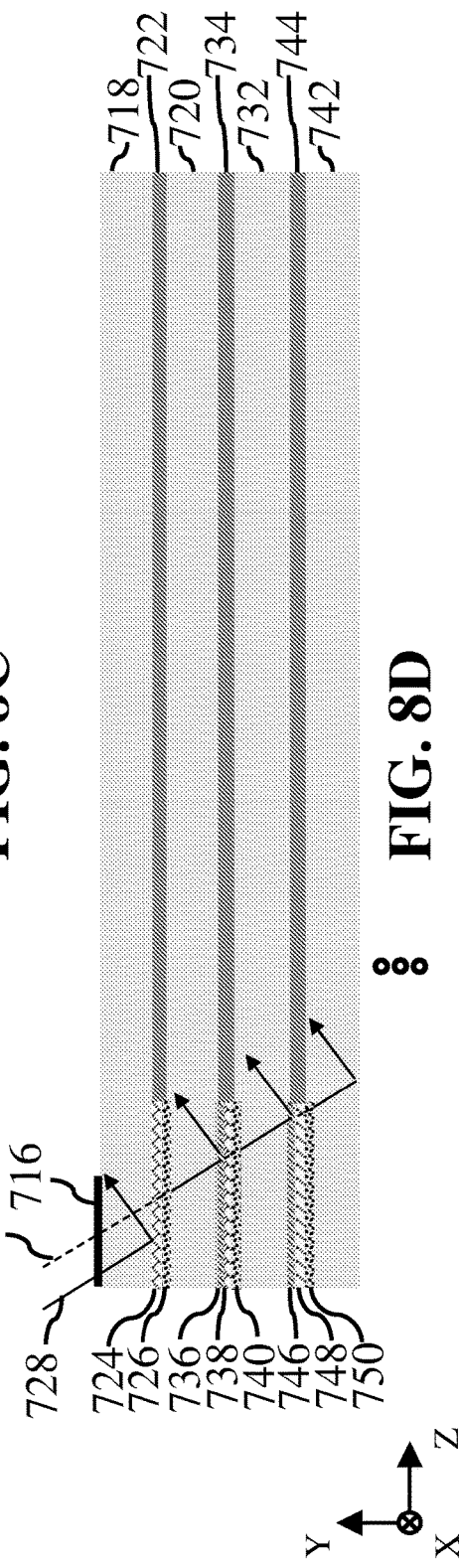

Referring to FIG. 8D, in an illustrative embodiment, LOE components 718, 720 and 732 of LOE 714 are stacked on top of each other and joined together by adhesive or coating 722 and 734 as described above for FIG. 8C. In this embodiment, LOE component 732 is further stacked on an LOE component 742 and joined by an adhesive or coating 744 that is similar to adhesive or coating 722. In proximity to coupling-in region 716, PBS 724 and HWP 726 are disposed between LOE components 718 and 720 and AHWP 736, PBS 738 and HWP 740 are disposed between LOE components 720 and 732 and an AHWP 746, a PBS 748 and an HWP 750 are disposed between LOE components 732 and 742.

As shown in FIG. 8D, light beams enter into the top LOE component 718, e.g., via coupling-in region 716. The light beams may be generated by a POD such as, e.g., PODs 212, 412, 512, 612 or 712. As an example, the light beams have an S or P polarization based the activation state of an AHWP such as, e.g., AHWP 220, 420, etc., as described in the above embodiments.

If light beam 728 having an S polarization enters LOE component 718 through coupling-in region 716, light beam 728 will be redirected by PBS 724 and propagate through LOE component 718. If light beam 730 having a P polarization enters LOE component 718 through coupling-in region 716, light beam 730 passes through PBS 724 and is changed to an S polarization by HWP 726. Light beam 730 then enters LOE component 720.

If AHWP 736 is not active, light beam 730 will pass through AHWP 736 without being changed from S polarization to P polarization and will be redirected by PBS 738 back into LOE component 720. Light beam 730 then propagates through LOE component 720.

If AHWP 736 is active, light beam 730 is converted into P polarization by AHWP 736, passes through PBS 738 and is converted back into S polarization by HWP 740. Light beam 730 then enters LOE component 732.

If AHWP 746 is not active, light beam 730 will pass through AHWP 746 without being changed from S polarization to P polarization and will be redirected by PBS 748 back into LOE component 732. Light beam 730 then propagates through LOE component 732.

If AHWP 746 is active, light beam 730 is converted into P polarization by AHWP 746, passes through PBS 748 and is converted back into S polarization by HWP 750. Light beam 730 then propagates through LOE component 742.

LOE components 718, 720, 732 and 742 comprise facets such as, e.g., facets 232 (FIG. 2) that are configured to redirect light beams toward another LOE such as, e.g., LOE component 230, that is configured to couple-out the light beams to eye 180 (FIG. 1A). In the embodiment of FIG. 8D, each of LOE components 718, 720, 732 and 742 may be responsible for a portion of the image FOV, e.g., one quarter of the image FOV.

As shown in FIG. 8D, LOE 714 may comprise any other number of additional stacked LOE components, each of which may be responsible for a portion of the image FOV. For example, with five stacked LOE components, each component may be responsible for one fifth of the image FOV, with six stacked LOE components, each component may be responsible for one sixth of the image FOV, and so on.

In some embodiments, each stacked LOE component 718, 720, 732 and 742 may have one optical path for directing light beams into eye 180 (FIG. 1A), e.g., via facets of that LOE component. In other embodiments, each stacked LOE component 718, 720, 732 and 742 may have multiple optical paths such as those illustrated in FIGS. 2, 5, 6 and 7 where additional LOE components may be utilized to direct the light beams into eye 180.

In each of the embodiments of FIGS. 8A-8D, controller 140 (FIG. 1A) is configured to synchronize between the image generated by the POD and the activations of the AHWPs in a manner that allows a user to experience a complementary image at eye 180 (FIG. 1A). For example, in the case of FIG. 8C, controller 140 may be configured to cycle through particular activations states for the AHWPs in a manner that causes light beams to propagate through each LOE component 718, 720 and 732 in sequence to project each one third of the image FOV onto eye 180.

Figure 9:
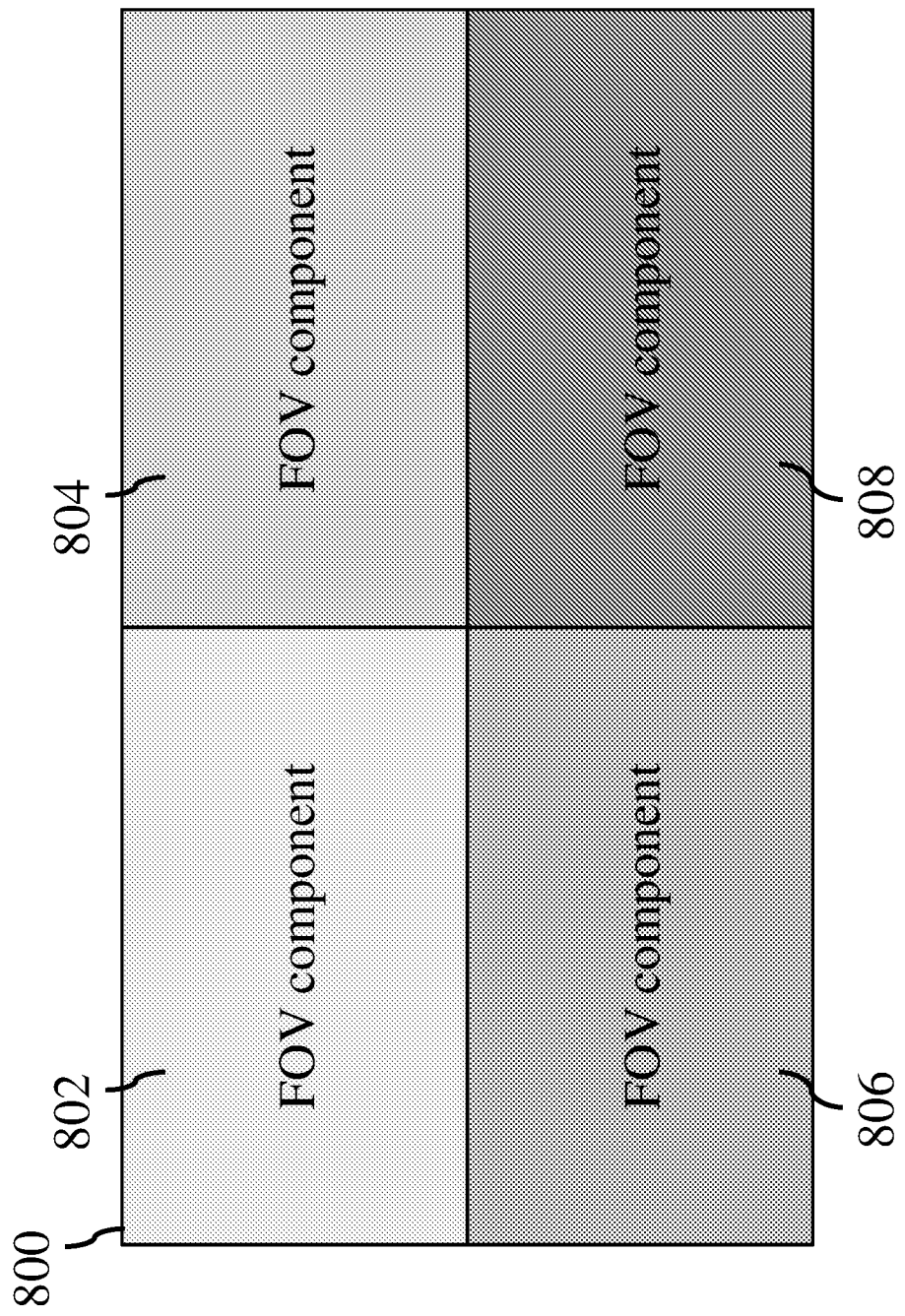
FIG. 9 is a diagram of example image FOV components according to an embodiment.

With reference to FIG. 9, an example image FOV 800 comprising overlapping FOV components 802, 804, 806 and 808 is illustrated. Each of FOV components 802, 804, 806 and 808 is projected onto eye 180 (FIG. 1A) by a different optical path. In some embodiments, some or all of FOV components 802, 804, 806 and 808 may overlap in a similar manner to that described above with reference to FIG. 4. Example LOEs 1014, 1114, and 1214 that may provide image FOV 800 to eye 180 will now be described with reference to FIGS. 10A-12B.

With reference to FIGS. 10A and 10B, an LOE 1014 according to an illustrative embodiment will be described. LOE 1014 comprises a coupling-in region 1016 in a corner of LOE 1014, a PBS 1020, a mirror 1022, a HWP 1024, an LOE component 1026, an LOE component 1028, an LOE component 1030 and an LOE component 1032. LOE component 1026 comprises facets 1034, LOE component 1028 comprises facets 1036, LOE component 1030 comprises facets 1038 and LOE component 1032 comprises facets 1040. LOE components 1030 and 1032 are separated by a layer 1042 such as, e.g., an adhesive, coating, air gap or other layer. In some embodiments, LOE components 1026 and 1028 are separated from LOE components 1030 and 1032 by a layer 1043 that may be similar to layer 1042. In some embodiments, layer 1042 may comprise an adhesive such as, e.g., adhesive or coating 722 as described above. In some embodiments, LOE components 1030 and 1032 may be stacked on top of each other to form layer 1042 without the use of an adhesive or coating, for example, in a case where the major LOE surfaces of LOE components 1030 and 1032 are not well polished.

LOE component 1030 comprises an optical isolator 1044 and LOE component 1032 comprises an optical isolator 1046. In some embodiments, optical isolator 1044 comprises a different material or different properties than optical isolator 1046. In other embodiments, optical isolators 1044 and 1046 may comprise the same material or properties. Optical isolators 1044 and 1046 are configured to allow light beams to enter their respective LOE components 1030 and 1032 from one or both of LOE components 1026 and 1028 and to inhibit light beams from being reflected back into LOE components 1026 and 1028.

Each of PBS 1020, mirror 1022, HWP 1024, LOE component 1026, LOE component 1028, LOE component 1030, LOE component 1032, facets 1034, facets 1036, facets 1038, facets 1040, layer 1042 and layer 1043 function in a similar manner to similar components as described above in other embodiments.

As shown in FIG. 10A, light beams enter into the LOE 1014, e.g., via coupling-in region 1016. The light beams may be generated by a POD such as, e.g., PODs 212, 412, 512, 612 or 712. As an example, the light beams have an S or P polarization based on the activation state of an AHWP such as, e.g., AHWP 220, 420, etc., as described in the above embodiments.

If a light beam 1048 having an S polarization enters LOE 1014 through coupling-in region 1016, light beam 1048 will be redirected by PBS 1020, propagate through LOE component 1026 and be directed by facets 1034 toward one or both of LOE components 1030 and 1032. If a light beam 1050 having a P polarization enters LOE 1014 through coupling-in region 1016, light beam 1050 passes through PBS 1020, is redirected by mirror 1022 toward HWP 1024 and is changed to an S polarization by HWP 1024. Light beam 1050 then propagates through LOE component 1028 and is directed by facets 1036 toward one or both of LOE components 1030 and 1032. In some embodiments, different facets 1034 and 1036 of each LOE component 1026 and 1028 may be configured to direct light beams into a corresponding one of LOE components 1030 and 1032, e.g., based on the different facet angles needed to fill the FOV. The light beams 1048 and 1050 enter LOE components 1030 and 1032, pass through optical isolators 1044 and 1046 and are coupled-out to eye 180 (FIG. 1A) by facets 1038 and 1040.

With reference back to FIG. 9, for example, FOV component 802 may correspond to light beams following an optical path through LOE component 1026 and LOE component 1030, FOV component 804 may correspond to light beams following an optical path through LOE component 1028 and LOE component 1030, FOV component 806 may correspond to light beams following an optical path through LOE component 1026 and LOE component 1032 and FOV component 808 may correspond to light beams following an optical path through LOE component 1028 and LOE component 1032. In this manner an enlarged image FOV may be projected onto eye 180 (FIG. 1A) without increasing the size, weight, power consumption or other properties of the POD.

Figures 11A, 11B:
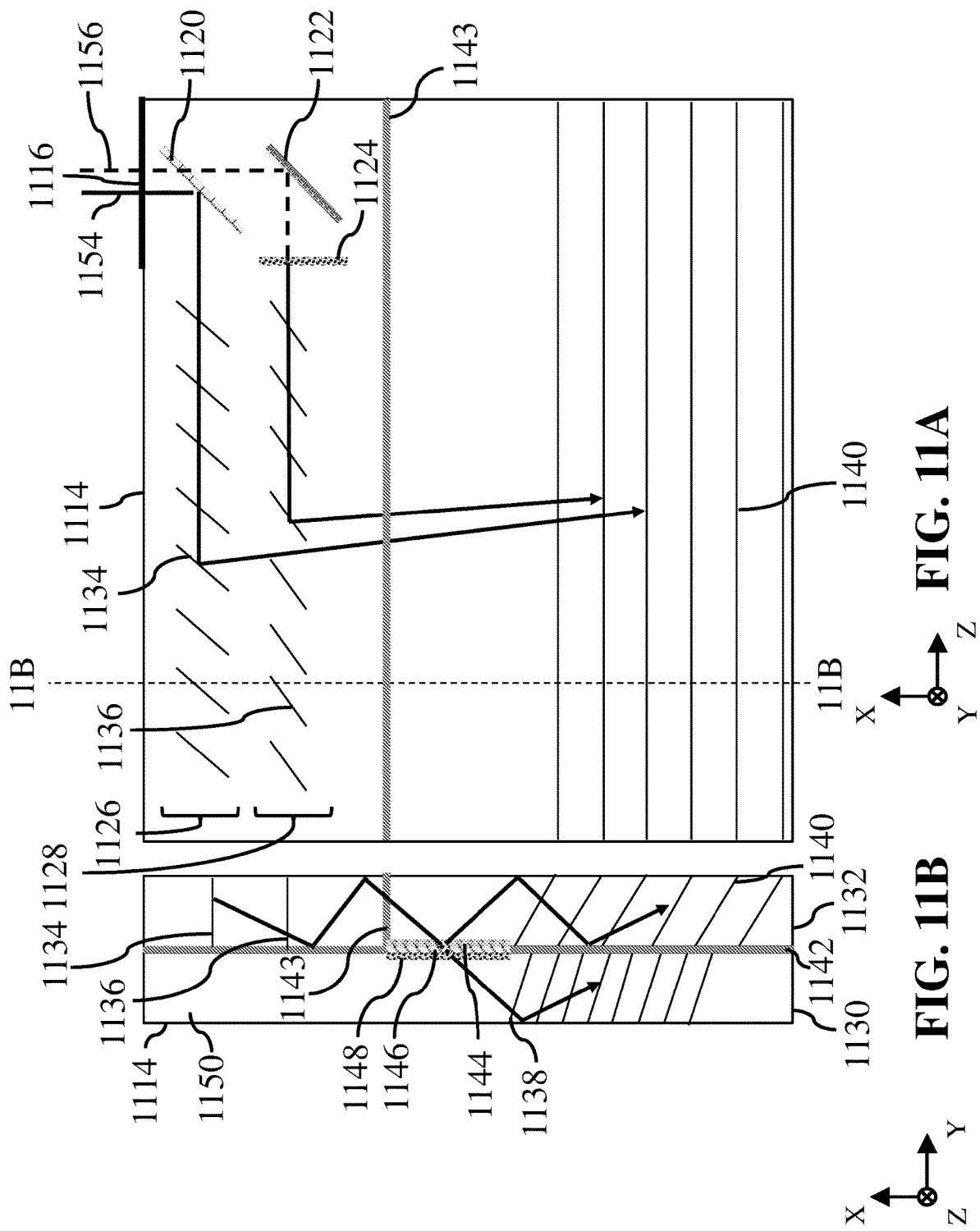
FIGS. 11A and 11B are schematic diagrams of another example LOE that is configured to output the image FOV components of FIG. 9 according to another embodiment where

With reference to FIGS. 11A and 11B, an LOE 1114 according to an illustrative embodiment will be described. LOE 1114 comprises a coupling-in region 1116 in a corner of LOE 1114, a PBS 1120, a mirror 1122, a HWP 1124, an LOE component 1126, an LOE component 1128, an LOE component 1130 and an LOE component 1132. LOE component 1126 comprises facets 1134, LOE component 1128 comprises facets 1136 and LOE component 1130 comprises facets 1138 and LOE component 1132 comprises facets 1140. LOE components 1130 and 1132 are separated by a layer 1142 such as, e.g., adhesive, coating, air gap or other coating. In some embodiments, LOE components 1126 and 1128 are separated from LOE components 1130 and 1132 by a layer 1143 that may be similar to layer 1142. Disposed between LOE component 1130 and LOE component 1132 is an AHWP 1144, a PBS 1146 and a HWP 1148 that function in a similar manner to similar components as described above.

LOE component 1130 comprises an inactive region 1150, e.g., inert glass or another inert material, and is configured to receive light beams via AHWP 1144, PBS 1146 and HWP 1148 from LOE component 1132. For example, LOE component 1132 is configured to receive light beams from LOE components 1126 and 1128. The light beams propagate through LOE component 1132 and depending on whether or not AHWP 1144 is active, will either pass through AHWP 1144, PBS 1146 and HWP 1148 into LOE component 1130 or be redirected by PBS 1146 back into LOE component 1132.

Each of PBS 1120, mirror 1122, HWP 1124, LOE component 1126, LOE component 1128, LOE component 1130, LOE component 1132, facets 1134, facets 1136, facets 1138, facets 1140, layer 1142, layer 1143, AHWP 1144, PBS 1146 and HWP 1148 function in a similar manner to similar components as described above in other embodiments.

As shown in FIG. 11A, light beams enter into the LOE 1114, e.g., via coupling-in region 1116. The light beams may be generated by a POD such as, e.g., PODs 212, 412, 512, 612 or 712. As an example, the light beams have an S or P polarization based on the activation state of an AHWP such as, e.g., AHWP 220, 420, etc., as described in the above embodiments.

If a light beam 1154 having an S polarization enters LOE 1114 through coupling-in region 1116, light beam 1154 will be redirected by PBS 1120, propagate through LOE component 1126 and be directed by facets 1134 toward LOE component 1132. If a light beam 1156 having a P polarization enters LOE 1114 through coupling-in region 1116, light beam 1156 passes through PBS 1120, is redirected by mirror 1122 toward HWP 1124 and is changed to an S polarization by HWP 1124. Light beam 1156 then propagates through LOE component 1128 and is directed by facets 1136 toward LOE component 1132. The light beams 1154 and 1156 then propagate through LOE component 1132.

As shown in FIG. 11B, if AHWP 1144 is not active, the corresponding light beam will pass through AHWP 1144 without being changed from S polarization to P polarization and will be redirected by PBS 1146 back into LOE component 1132. The light beam then propagates through LOE component 1132 and is coupled-out to eye 180 (FIG. 1A), e.g., via facets 1140.

If AHWP 1144 is active, the corresponding light beam is converted into P polarization by AHWP 1144, passes through PBS 1146 and is converted back into S polarization by HWP 1148. The light beam then enters and propagates through LOE component 1130 and is coupled-out to eye 180 (FIG. 1A), e.g., via facets 1138.

With reference back to FIG. 9, for example, FOV component 802 may correspond to light beams following an optical path through LOE component 1126 and LOE component 1130, FOV component 804 may correspond to light beams following an optical path through LOE component 1128 and LOE component 1130, FOV component 806 may correspond to light beams following an optical path through LOE component 1126 and LOE component 1132 and FOV component 808 may correspond to light beams following an optical path through LOE component 1128 and LOE component 1132. In this manner an enlarged image FOV may be projected onto eye 180 (FIG. 1A) without increasing the size, weight, power consumption or other properties of the POD.

With reference to FIGS. 12A-12D, an LOE 1214 according to an illustrative embodiment will be described. LOE 1214 comprises a coupling-in region 1216 in a corner of LOE 1214, an LOE component 1226, an LOE component 1228, an LOE component 1230 and an LOE component 1232. LOE components 1226 and 1228 comprise rectangular waveguides 1215, sometimes referred to as helix or helical waveguides, each having four major LOE surfaces 1217, 1218, 1219 and 1221 that each function in a similar manner to major LOE surfaces 116 and 118 (FIG. 1) to allow light to propagate off of each of the four major LOE surfaces instead of just two parallel major LOE surfaces such as shown in FIG. 1A.

As shown in FIG. 12D, LOE components 1226 and 1228 are stacked on top of each other, for example, in a similar manner to that shown in FIG. 8B for LOE components 718 and 720. For example, LOE components 1226 and 1228 may be stacked in the Y-direction in some embodiments. Other stacking directions may alternatively be utilized. Disposed between LOE components 1226 and 1228 is a PBS 1224 and an HWP 1231 that function in a similar manner to that described above for FIG. 8B. In some embodiments, LOE components 1226 and 1228 are joined together by an adhesive or coating 1225 as described above for FIG. 8B.

As shown in FIGS. 12A and 12B, LOE component 1226 comprises facets 1234, LOE component 1228 comprises facets 1236, LOE component 1230 comprises facets 1238 and LOE component 1232 comprises facets 1240. While facets 1234 and 1236 are illustrated as being perpendicular to major LOE surfaces 1217, 1218, 1219 and 1221, in some embodiments, some or all of facets 1234 and 1236 may alternatively be oblique to major LOE surfaces 1217, 1218, 1219 and 1221.

LOE components 1230 and 1232 are separated by a layer 1242 such as, e.g., an adhesive, coating or other layer. In some embodiments, LOE components 1226 and 1228 are separated from LOE components 1230 and 1232 by a layer 1243 that may be similar to layer 1242. Disposed between LOE component 1230 and LOE component 1232 is an AHWP 1244, a PBS 1246 and an AHWP 1248 that function in a similar manner to similar components as described above.

Referring again to FIGS. 12A-12D, in a similar manner to LOE components 718 and 720 of FIG. 8B, if a light beam 1227 having an S polarization enters LOE component 1226 through coupling-in region 1216, light beam 1227 will be redirected by PBS 1224, propagate through LOE component 1226 and be redirected into LOE component 1230 by facets 1234. If a light beam 1229 having a P polarization enters LOE component 1226 through coupling-in region 1216, light beam 1229 passes through PBS 1224 and is changed to an S polarization by HWP 1231. Light beam 1229 then propagates through LOE component 1228 and is redirected into LOE component 1232 by facets 1236.

The light beams propagate through LOE components 1230 and 1232 in a similar manner to that described above and will cross over from LOE component 1230 to LOE component 1232, and vice versa, if AHWP 1244 and AHWP 1248 are activated by controller 140 (FIG. 1A). For example, a light beam propagating within LOE component 1230, will either pass through AHWP 1248, PBS 1246 and AHWP 1244 into LOE component 1232 or be redirected by PBS 1246 back into LOE component 1230, depending on whether or not AHWP 1244 and AHWP 1248 are active to convert the polarization of the light beam from S to P polarization and back. Similarly, a light beam propagating within LOE component 1232, will either pass through AHWP 1244, PBS 1246 and AHWP 1248 into LOE component 1230 or be redirected by PBS 1246 back into LOE component 1232, depending on whether or not AHWP 1244 and AHWP 1248 are active to convert the polarization of the light beam from S to P polarization and back. The light beam is coupled-out to eye 180 by the corresponding facets 1238 and 1240 of the LOE component in which it is propagating.

Each of LOE component 1226, LOE component 1228, LOE component 1230, LOE component 1232, facets 1234, facets 1236, facets 1238, facets 1240, adhesive or coating 1225, layer 1242, layer 1243, AHWP 1244, PBS 1224, AHWP 1244, PBS 1246, AHWP 1248 and HWP 1231 function in a similar manner to similar components as described above in other embodiments. While LOE 1214 is illustrated as having two rectangular LOE components 1226 and 1228, any other number of rectangular LOE components may alternatively be utilized in a similar manner to that described above for FIGS. 8B-8D.

With reference back to FIG. 9, for example, each of FOV components 802-808 may correspond to one or more optical paths through LOE 1214 including, an optical path through LOE component 1226 and LOE component 1230 without passing through PBS 1246 into LOE component 1232, an optical path through LOE component 1226 and LOE component 1232 with the light beam passing through AHWP 1248, PBS 1246 and AHWP 1244 into LOE component 1232, an optical path through LOE component 1228 and LOE component 1232 without passing through PBS 1246 into LOE component 1230 and an optical path through LOE component 1228 and LOE component 1230 with the light beam passing through AHWP 1244, PBS 1246 and AHWP 1248 into LOE component 1230. In this manner an enlarged image FOV may be projected onto eye 180 (FIG. 1A) without increasing the size, weight, power consumption or other properties of the POD.

While the above embodiments each disclose the use of a particular number of LOE components, any other number of LOE components may alternatively be utilized in other embodiments. In addition, any of the above mentioned LOE components may alternatively be replaced with rectangular LOE components such as LOE components 1226 and 1228 in other embodiments.

With reference to FIG. 13, an example process for operating the optical system 100 will now be described. The process may be performed at least in part by controller 140 (FIG. 1A) or may be performed at least in part by any other portion of optical system 100. The process of FIG. 13 comprises steps 1300 through 1306. While the process of FIG. 13 is described herein as having particular steps or a particular order of steps, the process may alternatively perform the steps in any order, may include additional steps, may include fewer steps or may only perform a portion of the steps described below in other embodiments.

At step 1300, controller 140 determines the target coupling-out facet and angle to project an image FOV component onto eye 180 (FIG. 1A). For example, in some embodiments, controller 140 may determine the target coupling-out facet and angle based at least in part on the image FOV component to be projected and location information obtained from eye tracking system 30 regarding a location of the pupil of eye 180. In some embodiments, e.g., where eye tracking system 30 is not included or unavailable, controller 140 may alternatively determine the target coupling-out facet without the use of the location information.

At steps 1302, controller 140 identifies an optical path to the target coupling-out facet that will provide light beams to the target coupling-out facet at the corresponding angle, e.g., the optical paths as shown in FIGS. 2, 3, 5, 6, 7, 8B, 8C, 8D, 10A, 10B, 11A, 11B, 12A and 12B.

At step 1304, controller 140 determines a target AHWP state for each AHWP along the identified optical path, e.g., active to convert S polarization to P polarization or vice versa for passing through or reflecting off of a PBS.

At step 1306, controller 140 selectively sets the AHWP along the identified optical path to the target AHWP state.

At step 1308, controller 140 activates the POD to project the image FOV component along the identified optical path.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. An apparatus comprising at least one processor, the at least one processor being configured to:
   determine a target coupling-out facet;
   identify an optical path to the target coupling-out facet;
   identify an active wave plate corresponding to the optical path;
   determine a target state of the active wave plate that corresponds to the optical path;
   set the active wave plate to the target state; and
   cause a projection device to project a light beam comprising an image field of view component along the optical path.

2. The apparatus of claim 1, wherein the active wave plate is configured to transition between an activated state and a deactivated state, the active wave plate being configured to convert the light beam from a first polarization to a second polarization when in the activated state.

3. The apparatus of claim 2, the active wave plate comprises an active half wave plate.

4. The apparatus of claim 2, wherein the optical path comprises a polarizing beamsplitter (PBS), the PBS being configured to redirect light beams having the first polarization and to allow light beams having the second polarization to pass therethrough.

5. The apparatus of claim 4, wherein the PBS is embedded in a light-guide optical element (LOE) of the apparatus.

6. The apparatus of claim 5, wherein the LOE comprises:
a first LOE component;
a second LOE component; and
a third LOE component,
wherein each of the first, second and third LOE components comprises a plurality of facets, the first and second LOE components being configured to direct light beams to the third LOE component along different optical paths.

7. The apparatus of claim 6, wherein, the facets of the third LOE component comprise the target coupling-out facet.

8. The apparatus of claim 6, wherein, the LOE comprises a fourth LOE component, the first and second LOE components being configured to direct light beams to the third LOE component and the fourth LOE component along different optical paths, the facets of one of the third LOE component and the fourth LOE component comprising the target coupling-out facet.

9. The apparatus of claim 8, wherein, the LOE comprises a second PBS disposed between the third LOE component and the fourth LOE component, the second PBS being configured to redirect light beams from a respective one of the third and fourth LOE components that have the first polarization back into the respective one of the third and fourth LOE components and to allow light beams from the respective one of the third and fourth LOE components that have the second polarization to pass into the other of the third and fourth LOE components.

10. The apparatus of claim 9, wherein, the LOE comprises a second active wave plate disposed between the third LOE component and the fourth LOE component adjacent the second PBS, second active wave plate being configured to transition between the activated state and the deactivated state.

11. The apparatus of claim 10, wherein:
the second active wave plate is disposed on a first side of the second PBS, the first side corresponding to one of the third LOE component and the fourth LOE component; and
the LOE further comprises another wave plate disposed on a second side of the second PBS, the second side corresponding to the other of the third LOE component and the fourth LOE component, wherein the another wave plate is configured to convert the light beam from the first polarization to the second polarization.

12. The apparatus of claim 11, wherein the another wave plate comprises one of a third active wave plate and a half wave plate, the third active wave plate being configured to transition between the activated state and the deactivated state.

13. The apparatus of claim 6, wherein at least one of the first LOE component and the second LOE component comprises a rectangular waveguide.

14. A method comprising:
determining a target coupling-out facet;
identifying an optical path to the target coupling-out facet;
identifying an active wave plate corresponding to the optical path;
determining a target state of the active wave plate that corresponds to the optical path;
setting the active wave plate to the target state; and
causing a projection device to project a light beam comprising an image field of view component along the optical path.

15. The method of claim 14, wherein:
the active wave plate is configured to transition between an activated state and a deactivated state;
the active wave plate is configured to convert the light beam from a first polarization to a second polarization when in the activated state; and
setting the active wave plate to the target state comprises setting the active wave plate to one of the activated state and the deactivated state.

16. An optical system comprising:
a projection device that is configured to output a light beam having a first polarization;
an active wave plate that is configured to transition between an activated state and a deactivated state, the active wave plate being configured to convert the light beam output by the projection device from the first polarization to a second polarization when in the activated state;
a PBS that is configured to redirect light beams having the first polarization and to allow light beams having the second polarization to pass therethrough;
a first LOE component comprising a first plurality of facets;
a second LOE component comprising a second plurality of facets; and
a third LOE component comprising a third plurality of facets, wherein:
the first LOE component and the third LOE component define a first optical path from the projection device via the active wave plate and the PBS; and
the second LOE component and the third LOE component define a second optical path from the projection device via the active wave plate and the PBS.

17. The optical system of claim 16, wherein in the first optical path, the light beam output by the projection device is configured to pass through the active wave plate while the active wave plate is in the deactivated state and is redirected by the PBS toward the first LOE component.

18. The optical system of claim 16, wherein in the second optical path, the light beam output by the projection device is configured to pass through the active wave plate while the active wave plate is in the activated state, the active wave plate being configured to convert the light beam to the second polarization, the light beam having the second polarization being configured to pass through the PBS toward the second LOE component.

19. The optical system of claim 16, wherein each of the first and second LOE components is configured to direct light beams to the third LOE component, the third LOE component being configured to couple-out light beams from the optical system.

20. The optical system of claim 16, wherein:
the optical system further comprises a fourth LOE component;
the first LOE component and the fourth LOE component define a third optical path from the projection device via the active wave plate and the PBS;
the second LOE component and the fourth LOE component define a fourth optical path from the projection device via the active wave plate and the PBS;
each of the first and second LOE components is configured to direct light beams to the each of the third LOE component and the fourth LOE component; and
the third LOE component and the fourth LOE components are configured to couple-out light beams from the optical system.

* * * * *